United States Patent
Futaki et al.

(10) Patent No.: US 10,750,389 B2
(45) Date of Patent: *Aug. 18, 2020

(54) RADIO TERMINAL, RADIO STATION, RADIO COMMUNICATION SYSTEM, AND METHODS IMPLEMENTED THEREIN

(71) Applicant: NEC Corporation, Tokyo (JP)

(72) Inventors: Hisashi Futaki, Tokyo (JP); Hiroaki Aminaka, Tokyo (JP); Hiroto Sugahara, Tokyo (JP); Yoshikazu Kakura, Tokyo (JP); Kazushi Muraoka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/692,460

(22) Filed: Nov. 22, 2019

(65) Prior Publication Data

US 2020/0092736 A1    Mar. 19, 2020

Related U.S. Application Data

(63) Continuation of application No. 16/255,408, filed on Jan. 23, 2019, now Pat. No. 10,524,146, which is a
(Continued)

(30) Foreign Application Priority Data

Apr. 27, 2012   (JP) .................................. 2012-102336

(51) Int. Cl.
*H04W 72/00*      (2009.01)
*H04W 24/08*      (2009.01)
(Continued)

(52) U.S. Cl.
CPC ............ *H04W 24/08* (2013.01); *H04B 17/24* (2015.01); *H04B 17/309* (2015.01);
(Continued)

(58) Field of Classification Search
None
See application file for complete search history.

(56) References Cited

U.S. PATENT DOCUMENTS 6,229,792 B1    5/2001   Anderson et al.
9,420,482 B2    8/2016   Futaki et al.
(Continued)

FOREIGN PATENT DOCUMENTS

EP    2373079 A1    10/2011
EP    2384074 A1    11/2011
(Continued)

OTHER PUBLICATIONS

3GPP TS 37.320 V10.4.0 (Dec. 2011), Technical Specification, 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2, (Release 10), p. 3, 18 pages.
(Continued)

*Primary Examiner* — Adolf Dsouza
(74) *Attorney, Agent, or Firm* — Wilmer Cutler Pickering Hale and Dorr LLP

(57) ABSTRACT

A radio terminal (2) is used in a radio communication system (100) and communicates with a radio station (1). The radio terminal (2) includes a measurement unit (20). The measurement unit (20) operates to perform, using a terminal measurement procedure for executing a first terminal measurement corresponding to radio access technology applied to the radio communication system (100), a second terminal measurement of a shared frequency shared by a plurality of radio systems including the radio communication system (100).

12 Claims, 17 Drawing Sheets

Related U.S. Application Data continuation of application No. 15/965,321, filed on Apr. 27, 2018, now Pat. No. 10,237,772, which is a continuation of application No. 15/668,936, filed on Aug. 4, 2017, now Pat. No. 10,028,158, which is a continuation of application No. 15/199,264, filed on Jun. 30, 2016, now Pat. No. 9,781,618, which is a continuation of application No. 14/396,268, filed as application No. PCT/JP2013/000088 on Jan. 11, 2013, now Pat. No. 9,420,482.

(51) Int. Cl.

| | | |
|---|---|---|
| *H04W 76/27* | (2018.01) | |
| *H04B 17/309* | (2015.01) | |
| *H04B 17/24* | (2015.01) | |
| *H04B 17/318* | (2015.01) | |
| *H04B 17/382* | (2015.01) | |
| *H04W 24/10* | (2009.01) | |
| *H04W 16/14* | (2009.01) | |
| *H04W 88/02* | (2009.01) | |
| *H04W 72/04* | (2009.01) | |
| *H04W 88/10* | (2009.01) | |
| *H04L 5/00* | (2006.01) | |
| *H04W 72/08* | (2009.01) | |
| *H04W 88/06* | (2009.01) | |

(52) U.S. Cl.
CPC ......... *H04B 17/318* (2015.01); *H04B 17/382* (2015.01); *H04L 5/0048* (2013.01); *H04W 16/14* (2013.01); *H04W 24/10* (2013.01); *H04W 72/0453* (2013.01); *H04W 72/085* (2013.01); *H04W 76/27* (2018.02); *H04W 88/02* (2013.01); *H04W 88/10* (2013.01); *H04W 88/06* (2013.01)

(56) References Cited

U.S. PATENT DOCUMENTS

| | | |
|---|---|---|
| 9,781,618 B2 | 10/2017 | Futaki et al. |
| 10,028,158 B2 | 7/2018 | Futaki et al. |
| 2010/0008246 A1 | 1/2010 | Watanabe |
| 2010/0020852 A1 | 1/2010 | Erell et al. |
| 2010/0197317 A1 | 8/2010 | Sadek et al. |
| 2011/0164186 A1 | 7/2011 | Sadek et al. |
| 2011/0255619 A1 | 10/2011 | Nam et al. |
| 2011/0317577 A1 | 12/2011 | Yamada et al. |
| 2011/0319129 A1 | 12/2011 | Bhat et al. |
| 2012/0002580 A1 | 1/2012 | Nakashima et al. |
| 2012/0002643 A1 | 1/2012 | Chung et al. |
| 2012/0282942 A1 | 11/2012 | Uusitalo et al. |
| 2012/0307660 A1 | 12/2012 | Lindoff et al. |
| 2013/0003591 A1 | 1/2013 | Novak et al. |
| 2013/0005240 A1 | 1/2013 | Novak et al. |
| 2013/0010619 A1 | 1/2013 | Fong et al. |
| 2013/0064197 A1 | 3/2013 | Novak et al. |
| 2013/0114418 A1 | 5/2013 | Kubota et al. |
| 2013/0189970 A1 | 7/2013 | Fukuta |
| 2013/0201884 A1 | 8/2013 | Freda et al. |
| 2014/0056166 A1 | 2/2014 | Yamada et al. |
| 2014/0378157 A1 | 12/2014 | Wei et al. |
| 2015/0133138 A1 | 5/2015 | Bhat et al. |
| 2016/0057745 A1 | 2/2016 | Yamada et al. |
| 2018/0249357 A1 | 8/2018 | Futaki et al. |

FOREIGN PATENT DOCUMENTS

| | | |
|---|---|---|
| JP | 2010-011350 A | 1/2010 |
| JP | 2010-021648 A | 1/2010 |
| JP | 2011-166721 A | 8/2011 |
| JP | 2011-217377 A | 10/2011 |
| JP | 2012-060456 A | 3/2012 |
| JP | 2012-102336 A | 5/2012 |
| JP | 2012-517147 A | 7/2012 |
| WO | WO-2010/088586 A2 | 8/2010 |
| WO | WO-2010/113490 A1 | 10/2010 |
| WO | WO-2011/035420 A1 | 3/2011 |
| WO | WO-2011/099634 | 8/2011 |
| WO | WO-2011/115421 A2 | 9/2011 |
| WO | WO-2011/142715 A1 | 11/2011 |
| WO | WO-2011/160077 A1 | 12/2011 |
| WO | WO-2012/029237 A1 | 3/2012 |
| WO | WO-2012/037637 A1 | 3/2012 |
| WO | WO-2012/046853 A1 | 4/2012 |
| WO | WO-2012/051303 A1 | 4/2012 |
| WO | WO-2012/139301 A1 | 10/2012 |
| WO | WO-2013/052805 A1 | 4/2013 |

OTHER PUBLICATIONS

ETSI TR 102 907 V1.1.1 (Oct. 2011),"Reconfigurable Radio Systems (RRS); Use Cases for Operation in White Space Frequency Bands," Oct. 2011, p. 3, 62 pages.

Extended European Search Report corresponding European Application No. 13782054.4, dated Oct. 5, 2015, 8 pages.

Extended European Search Report issued by the European Patent Office for Application No. 16172589.0 dated Sep. 20, 2016 (9 pages).

Huawei "Discussion on UTRAN ANR", 3GPP TSG RAN WG2 #70bis, R2-103590, Stockholm, Sweden,Jun. 28-Jul. 2 July 210, pp. 1-3.

International Search Report, corresponding to PCT/JP2013/000088, dated Feb. 19, 2013.

Japanese Notfiication of Reasons for Refusal issued in corresponding Japanese Patent Application No. 2014-512299, dated Jan. 31, 2017, 7 pages.

Japanese Notice of Reasons for Refusal issued in Japanese Patent Application No. 2018-151260, dated May 7, 2019, 6 pages.

Japanese Office Action issued by the Japan Patent Office for Japanese Application No. 2017-086013 dated Apr. 17, 2018 (6 pages).

Media Tek Inc. "Discussion of Measurement Gap Signalling for Rel-10 CA UE", 3GPP TSG RAN WG2 #72BIS, R2-110265, Dublin, Ireland, Jan. 17-21, 2011, pp. 1-5 (5 pages).

MediaTek Inc. "s-Measure Handlling for Mobility and CC Management", 3GPP TSG-RAN WG2#70bis, R2-103632, Jun. 28-Jul. 2, 2010, Stockholm, Sweden, pp. 1-3.

Japanese Notice of Reasons for Refusal issued in Japanese Patent Application No. 2019-139818, dated Apr. 21, 2020, 8 pages.

RADIO TERMINAL, RADIO STATION, RADIO COMMUNICATION SYSTEM, AND METHODS IMPLEMENTED THEREIN

CROSS-REFERENCE TO RELATED APPLICATIONS

The present application is a continuation of U.S. patent application Ser. No. 16/255,408, filed Jan. 23, 2019, entitled "Radio Terminal, Radio Station, Radio Communication System, and Methods Implemented Therein," which is a continuation of U.S. patent application Ser. No. 15/965,321, filed Apr. 27, 2018, now U.S. Pat. No. 10,237,772, entitled "Radio Terminal, Radio Station, Radio Communication System, and Methods Implemented Therein," which is a continuation of U.S. patent application Ser. No. 15/668,936, filed Aug. 4, 2017, now U.S. Pat. No. 10,028,158, entitled "Radio Terminal, Radio Station, Radio Communication System, and Methods Implemented Therein", which is a continuation of U.S. patent application Ser. No. 15/199,264, filed Jun. 30, 2016, now U.S. Pat. No. 9,781,618, entitled "Radio Terminal, Radio Station, Radio Communication System, and Methods Implemented Therein," which is a continuation of U.S. patent application Ser. No. 14/396,268, filed Oct. 22, 2014, now U.S. Pat. No. 9,420,482, entitled "Radio Terminal, Radio Station, Radio Communication System, and Methods Implemented Therein," which is a national stage application of International Application No. PCT/JP2013/000088 entitled "Radio Terminal, Radio Station, Radio Communication System, and Methods Implemented Therein," filed on Jan. 11, 2013, which claims the benefit of priority from Japanese Patent Application No. JP2012-102336, filed on Apr. 27, 2012, the disclosures of which are incorporated herein in their entirety by reference thereto.

TECHNICAL FIELD

The present invention relates to control of utilization of a shared frequency by a radio communication system.

BACKGROUND ART

Cognitive radio recognizes a surrounding wireless environment and optimizes communication parameters according to the wireless environment. One example of the cognitive radio is a case in which a plurality of radio systems share a frequency band. For example, there is a case in which a frequency band that can be preferentially used by one radio system (called a primary system) is secondarily used by another radio system (called a secondary system). It is discussed in Institute of Electrical and Electronic Engineers (IEEE) 802.22 to standardize a wireless regional area network (WRAN) corresponding to a secondary system which secondarily uses a frequency band (TV channel) licensed to a TV broadcasting system corresponding to a primary system.

When a secondary system secondarily uses a frequency band licensed to a primary system, it is necessary that the secondary system does not have any influence on services provided by the primary system. In order to avoid causing interference to the primary system, the secondary system uses a frequency band that is not temporally or spatially used by the primary system, or adjusts transmission power so that interference experienced by the primary system is below a tolerance level (see, e.g., patent literature 1).

A study has been actively carried out assuming a case in which, in one example of cognitive radio, a primary system is a TV broadcasting system and a secondary system is a cellular system. A frequency band which is not temporally or spatially used in a TV broadcasting system is called a TV white space (WS) (see, e.g., non-patent literature 1).

Some known examples of cognitive radio technology for specifying unused frequency bands include a Geo-location Database (GDB), frequency sensing, and a beacon (or Cognitive Pilot Channel (CPC)). Among these examples, two or more, e.g., a GDB and frequency sensing, or a GDB and a beacon, may be used in combination with each other. A GDB provides statuses of utilization of a shared frequency band (e.g., TV band) or information of a secondarily usable (i.e., unused) frequency band (e.g., TVWS), according to the geographical location.

For example, allocation of TVWS to a Long Term Evolution (LTE) system which is a cellular system is executed in the following procedure.

(1) An operation and management apparatus of an LTE system informs the GDB about information of a base station (i.e., evolved Node B (eNB)) which desires to use TVWS. The operation and management apparatus is also called an operation and management system, an Operation Administration and Maintenance (OAM) system, or a Central Control Point. The base station information indicates, for example, a geographical location of the base station and height of an antenna utilized by the base station.

(2) The GDB determines at least one candidate frequency that can be secondarily used based on the base station information, a frequency band, and a calculation formula of propagation loss, and then informs the operation and management apparatus about the at least one candidate frequency.

(3) The operation and management apparatus transfers information of at least one candidate frequency provided by the GDB to the base station.

(4) The base station selects a frequency used in its cell (hereinafter referred to as an allocated frequency) from the at least one candidate frequency, based on results of sensing the at least one candidate frequency by a radio terminal (i.e., User Equipment (UE)) belonging to its cell. The base station selects, for example, a candidate frequency on which the smallest interference power measured by the radio terminal as the allocated frequency used in its cell.

(5) The base station provides communication services using the allocated frequency.

CITATION LIST

Patent Literature

[Patent Literature 1] Japanese Unexamined Patent Application Publication No. 2011-166721

Non Patent Literature

[Non-Patent Literature 1] ETSI TR 102 907 V1.1.1 (2011-10), "Reconfigurable Radio Systems (RRS); Use Cases for Operation in White Space Frequency Bands", October 2011

[Non-Patent Literature 2] 3GPP TS 37.320 V10.4.0 (2011-12), "Radio measurement collection for Minimization of Drive Tests (MDT); Overall description", December 2011

SUMMARY OF INVENTION

Technical Problem

In the example of allocating TVWS to an LTE system described above, the radio terminal (UE) must support a frequency sensing function regarding the cognitive radio. Specifically, the radio terminal (UE) must support a frequency sensing function (or sensing procedure) regarding the cognitive radio in addition to a measurement function (or measurement procedure) of downlink signals defined by the LTE standard. This may lead to an increase in the size or complexity of hardware or software of the radio terminal (UE).

One object of the present invention is to provide a radio terminal, a radio station, a radio communication system, methods implemented therein, and programs that contribute to simplification of a measurement function which should be supported by the radio terminal when the radio communication system uses a shared frequency (e.g., TVWS) shared by a plurality of radio systems.

Solution to Problem

In a first aspect, a radio terminal that is used in a radio communication system and communicates with a radio station is provided. The radio terminal includes a measurement unit. The measurement unit operates to perform, using a terminal measurement procedure for executing a first terminal measurement corresponding to radio access technology applied to the radio communication system, a second terminal measurement of a shared frequency shared by a plurality of radio systems including the radio communication system.

In a second aspect, a radio station that is used in a radio communication system and communicates with at least one radio terminal is provided. The radio station includes a measurement controller. The measurement controller operates to control, using a terminal measurement procedure for controlling a first terminal measurement corresponding to radio access technology applied to the radio communication system, a second terminal measurement of a shared frequency shared by a plurality of radio systems including the radio communication system.

In a third aspect, a radio communication system includes a radio station and at least one radio terminal which communicates with the radio station. The at least one radio terminal operates to perform, using a terminal measurement procedure for executing a first terminal measurement corresponding to radio access technology applied to the radio communication system, a second terminal measurement of a shared frequency shared by a plurality of radio systems including the radio communication system.

In a fourth aspect, a method implemented in a radio terminal that is used in a radio communication system and communicates with a radio station is provided. This method includes executing, using a terminal measurement procedure for executing a first terminal measurement corresponding to radio access technology applied to the radio communication system, a second terminal measurement of a shared frequency shared by a plurality of radio systems including the radio communication system.

In a fifth aspect, a method implemented in a radio station that is used in a radio communication system and communicates with at least one radio terminal is provided. This method includes controlling, using a terminal measurement procedure for controlling a first terminal measurement corresponding to radio access technology applied to the radio communication system, a second terminal measurement of a shared frequency shared by a plurality of radio systems including the radio communication system.

In a sixth aspect, a program for causing a computer to perform the method according to the fourth aspect stated above is provided.

In a seventh aspect, a program for causing a computer to perform the method according to the fifth aspect stated above is provided.

Advantageous Effects of Invention

According to each aspect stated above, it is possible to provide a radio terminal, a radio station, a radio communication system, methods implemented therein, and programs that contribute to simplification of a measurement function which should be supported by the radio terminal when the radio communication system uses a shared frequency (e.g., TVWS) shared by a plurality of radio systems.

DETAILED DESCRIPTION

Hereinafter, with reference to the drawings, specific embodiments will be described in detail. Throughout the drawings, identical and corresponding components are denoted by the same reference symbols, and overlapping descriptions will be omitted as appropriate for the sake of clarification of description.

First Embodiment

Figure 1:
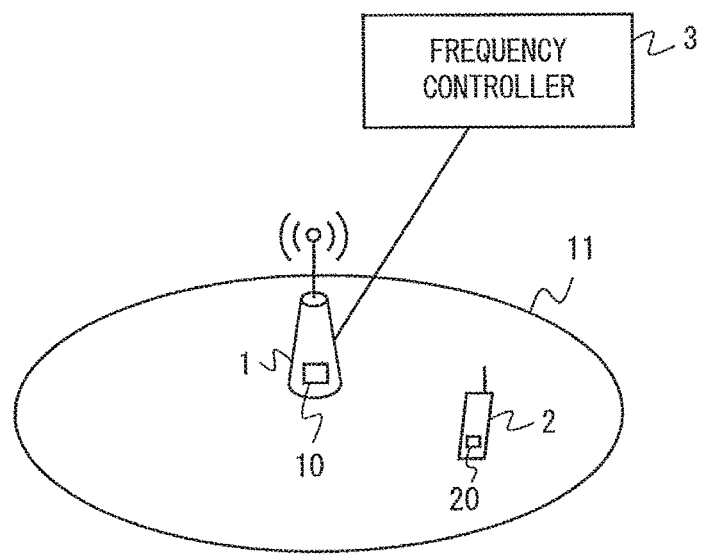
FIG. 1 is a diagram showing a configuration example of a radio communication system according to a first embodiment.

FIG. 1 shows a configuration example of a radio communication system 100 according to this embodiment. The radio communication system 100 may be a cellular system (e.g., LTE system, Universal Mobile Telecommunications System (UMTS), CDMA2000 system (EV-DO, 1×RTT, HPRD), or Global System for Mobile Communications (GSM) system). Otherwise, the radio communication system 100 may be a non-cellular system (e.g., WiMAX system, wireless Local Area Network (LAN) system).

The radio communication system 100 includes a radio station 1, a radio terminal 2, and a frequency controller 3. The radio station 1 operates a cell 11 and communicates with the radio terminal 2 belonging to the cell 11. The radio station 1 is called, for example, a base station, a relay node (RN), or an access point. The radio terminal 2 is called, for example, a mobile station, a User Equipment (UE), or a Wireless Transmit/Receive Unit (WTRU). The cell 11 means a coverage area of the radio station 1. The cell 11 may be a sector cell.

The frequency controller 3 operates to control utilization by the radio station 1 of a shared frequency shared by a plurality of radio systems including the radio communication system 100. The frequency controller 3 may determine, for example, whether to allow the radio station 1 to use the shared frequency. Further or alternatively, the frequency controller 3 may determine whether to use the shared frequency for communication between the radio station 1 and the radio terminal 2. Furthermore or alternatively, the frequency controller 3 may select a frequency to be allocated to the radio station 1 from candidate frequencies including the shared frequency. The allocated frequency is a frequency used for the communication between the radio station 1 and the radio terminal 2.

The shared frequency may be a frequency band licensed to a primary system (e.g., TVWS). In this case, for example, the radio communication system 100 as a secondary system can secondarily use the shared frequency when the shared frequency is not temporally or spatially used by the primary system. In other words, the radio communication system 100 can secondarily use the shared frequency (e.g., TVWS) which is not licensed to the radio communication system 100, as well as a frequency licensed to the radio communication system 100. Note that the primary system may not exist. In such a case, the shared frequency may be equally shared by a plurality of radio communication systems, e.g., a plurality of radio communication systems operated by different operators. The plurality of radio communication systems may include only systems using the same radio access technology (e.g., LTE) or may include systems using different radio access technologies (e.g., LTE, CDMA2000, GSM, WiMAX).

As already described above, in order to use the shared frequency such as TVWS in the radio communication system 100, the radio terminal 2 needs to support the frequency sensing function regarding the cognitive radio. This may lead to an increase in the size or complexity of hardware or software of the radio terminal 2.

In order to address this problem, in this embodiment, the radio terminal 2 includes a measurement unit 20. The measurement unit 20 operates to perform a second terminal measurement of the shared frequency by using a terminal measurement procedure implemented in the radio terminal 2 to perform a first terminal measurement defined by radio access technology (e.g., LTE, CDMA2000, GSM, WiMAX) applied to the radio communication system 100. The results of the second terminal measurement are supplied to the frequency controller 3 and are used to control the utilization by the radio station 1 of the shared frequency.

Meanwhile, the radio station 1 includes a measurement controller 10 in order to carry out the first and second terminal measurements stated above in collaboration with the radio terminal 2. The measurement controller 10 operates to control the first and second terminal measurements stated above.

The first terminal measurement at least includes measuring radio characteristics of the frequency licensed to the radio communication system 100 (i.e., licensed band). The first terminal measurement is performed using the terminal measurement procedure corresponding to radio access technology (e.g., LTE, UMTS, CDMA2000, GSM, WiMAX) applied to the radio communication system 100. In other words, the first terminal measurement is performed using the terminal measurement procedure specified (or defined) by the radio access technology applied to the radio communication system 100. The terminal measurement procedure typically includes signaling between the radio station 1 and the radio terminal 2. For example, the radio station 1 requests, using a predetermined request message, the terminal measurement report from the radio terminal 2. The request message specifies, for example, at least one of a frequency to be measured, measurement items to be reported, and a measurement period. The radio terminal 2 performs measurement of the specified frequency according to the request message. The radio terminal 2 then sends a terminal measurement report indicating the measurement results to the radio station 1. The terminal measurement report includes, for example, at least one of the following (a) to (e):

(a) Received power or received strength of a signal of the radio communication system 100 in the shared frequency;

(b) Received quality of a signal of the radio communication system 100 in the shared frequency;

(c) Communication path quality of the radio communication system 100 in the shared frequency;

(d) Information regarding the shared frequency (e.g., preferred frequency, priority); and (e) Received power or received strength of a signal from the primary system in the shared frequency.

Note that the first terminal measurement and the terminal measurement procedure typically support measurement of a plurality of licensed bands. The terminal measurement procedure includes, for example, an inter-frequency measurement procedure for measuring the plurality of licensed bands. The terminal measurement procedure may include a procedure for measuring a secondary cell while a primary cell and the secondary cell have been configured for the radio terminal 2 by the radio station 1. The primary cell and the secondary cell use licensed bands different from each other. The operation in which the radio station 1 operates a plurality of cells including the primary cell and the secondary cell is called, for example, carrier aggregation (CA) or a dual-cell operation.

Further or alternatively, the terminal measurement procedure may include a procedure for measuring one or more licensed bands while the radio terminal 2 has established a radio connection with the radio station 1 and reporting the measurement results and the location information of the radio terminal 2 to the radio station 1. Further or alternatively, the terminal measurement procedure may include a procedure for measuring one or more licensed bands while the radio terminal 2 does not have a radio connection with the radio station 1, storing the measurement results and the location information of the radio terminal 2 as a log, and reporting the log to the radio station 1 while having established radio communication with the radio station 1. The former procedure is called, for example, Immediate Minimization of Drive Test (Immediate MDT) and the latter procedure is called, for example, Logged MDT (see Non-patent literature 2).

The measurement controller 10 and the measurement unit 20 carry out the second terminal measurement of the shared frequency by using the terminal measurement procedure for the first terminal measurement stated above. The measurement controller 10 and the measurement unit 20 may apply, for example, an inter-frequency measurement procedure for measuring the licensed band to measure the shared frequency which is a non-licensed band (or a frequency band which is not exclusively licensed). Further, the measurement controller 10 and the measurement unit 20 may apply the secondary cell measurement procedure in the carrier aggregation (or dual-cell operation) to the measurement of the shared frequency.

Figure 2:
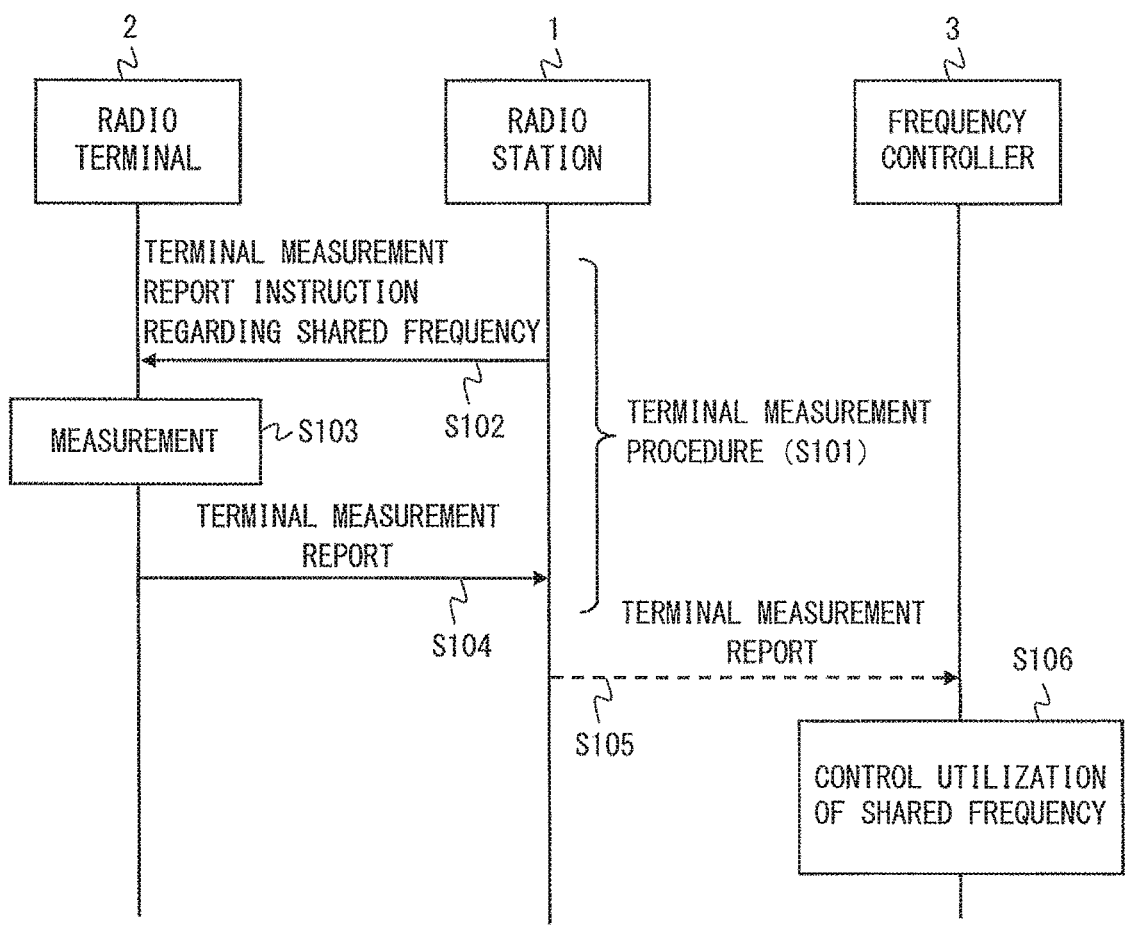
FIG. 2 is a sequence diagram showing a specific example of a procedure for controlling utilization of a shared frequency in the radio communication system according to the first embodiment.

FIG. 2 is a sequence diagram showing a specific example of a procedure for controlling the utilization of the shared frequency according to this embodiment. In Step S101, the radio terminal 2 performs, in accordance with an instruction from the radio station 1, the terminal measurement procedure to measure radio characteristics of the shared frequency. In the example shown in FIG. 2, the terminal measurement procedure includes Steps S102 to S104. In Step S102, the radio station 1 sends to the radio terminal 2 a terminal measurement report instruction requesting a terminal measurement of the shared frequency. The terminal measurement report instruction is transmitted on, for example, a control or data channel available in the licensed band. In Step S103, the radio terminal 2 measures the shared frequency in accordance with the terminal measurement report instruction. In Step S104, the radio terminal 2 sends the terminal measurement report including the measurement results of the shared frequency to the radio station 1. The terminal measurement report is transmitted on, for example, a control or data channel available in the licensed band.

In Step S105, the radio station 1 sends the terminal measurement report to the frequency controller 3. Note that Step S105 may be omitted when the frequency controller 3 is integrally arranged with the radio station 1. In Step S106, the frequency controller 3 controls the utilization of the shared frequency by the radio station 1 based on the terminal measurement report including the measurement results of the shared frequency.

The terminal measurement procedure (S101) shown in FIG. 2 may be performed periodically or aperiodically. The execution of the aperiodic terminal measurement procedure (S101) may be triggered by a request from, for example, an operation management apparatus (OAM), a frequency management apparatus, or a GDB. The frequency management apparatus is also called a Spectrum Manager (SM), a frequency management system, or a Central Control Point. The radio station 1 may autonomously initiate the terminal measurement procedure (S101) in response to satisfaction of a predetermined condition. Further, the terminal measurement procedure (S101) may be concurrently performed for a plurality of candidate frequencies (frequency segments) included in the shared frequency or may be performed for each candidate frequency.

The frequency controller 3 described in this embodiment may perform a procedure for updating the allocated frequency to be allocated to the radio station 1. Further, the frequency controller 3 may perform a procedure for releasing the allocated frequency (i.e., a procedure for stopping the utilization by the radio station 1 of the shared frequency). The frequency controller 3 may stop the utilization by the radio station 1 of the shared frequency when a predetermined condition regarding the utilization of the shared frequency is no longer satisfied (in other words, when a predetermined release condition is satisfied).

Further, the frequency controller 3 may take into consideration other conditions than the terminal measurement report to control the utilization by the radio station 1 of the shared frequency, e.g., to determine whether to use the shared frequency or to determine whether to allow the utilization of the shared frequency. The frequency controller 3 may take into consideration the geographical location of the radio station 1. More specifically, the frequency controller 3 may determine whether the geographical location of the radio station 1 is within an area in which the utilization of the shared frequency is allowed. Further or alternatively, the frequency controller 3 may take into consideration frequencies that are able to be utilized by the radio station 1. Specifically, the frequency controller 3 may determine whether the shared frequency is within a frequency spectrum range that is able to be utilized by the radio station 1. Further or alternatively, the frequency controller 3 may take into consideration the maximum or minimum value of the downlink transmission power of the radio station 1.

As described above, in this embodiment, the radio station 1 and the radio terminal 2 operate to perform, using the terminal measurement procedure for executing the first terminal measurement specified (or defined) by the radio access technology (e.g., LTE, UMTS, CDMA2000, GSM, WiMAX) applied to the radio communication system 100, the second terminal measurement of the shared frequency. The radio terminal 2 therefore need not support an additional measurement procedure for measuring the shared frequency. This embodiment is therefore able to contribute to simplification of the measurement function which should be supported by the radio terminal 2 when the radio communication system 100 uses the shared frequency (e.g., TVWS) shared by a plurality of radio systems.

Figure 3:
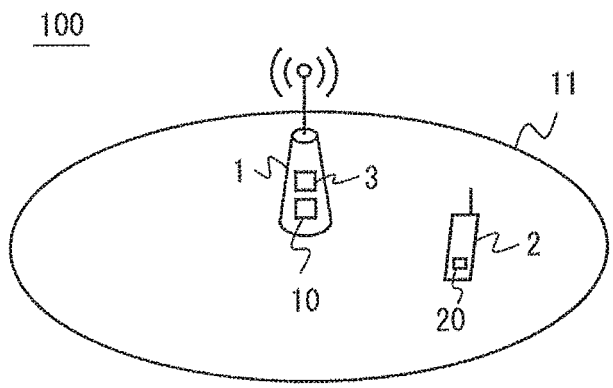
FIG. 3 is a diagram showing another configuration example of the radio communication system according to the first embodiment.

Meanwhile, the arrangement of the frequency controller 3 is determined as appropriate based on the design concept of the network architecture or based on the wireless communication standard. As shown in FIG. 3, for example, the frequency controller 3 may be integrally arranged with the radio station 1. In this case, the radio station 1 may determine the utilization of the shared frequency in, for example, the following procedure. The radio station 1 equipped with the frequency controller 3 first sends a request for allocation of the shared frequency to an operation and management apparatus (OAM) (not shown). The radio station 1 then receives a notification indicating at least one candidate frequency from the operation and management apparatus (OAM). Each candidate frequency may be an unused sub-band included in the shared frequency. The radio station 1 then determines the allocated frequency to be utilized by the radio station 1 from at least one candidate frequency. Lastly, the radio station 1 sends to the operation and management apparatus a report (i.e., allocated frequency report) indicating the allocated frequency that is selected.

Figure 4:
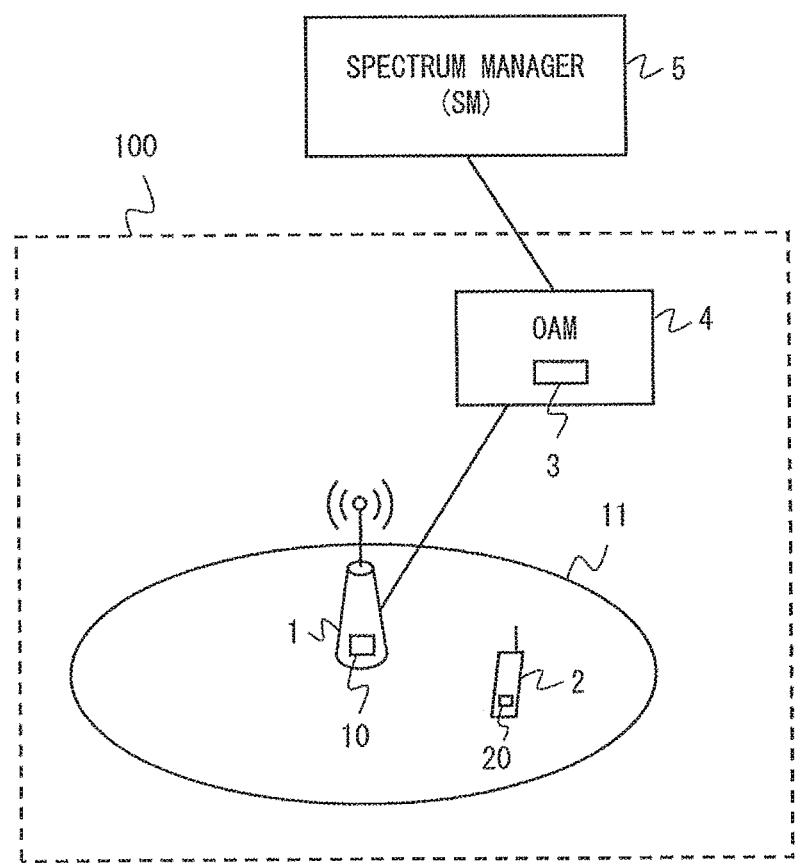
FIG. 4 is a diagram showing another configuration example of the radio communication system according to the first embodiment.

As shown in FIG. 4, the frequency controller 3 may be integrally arranged with the operation and management apparatus (OAM) 4. In this case, the operation and management apparatus 4 may determine the utilization by the radio station 1 of the shared frequency in, for example, the following procedure. The operation and management apparatus 4 first receives a request for allocation of the shared frequency from the radio station 1. The operation and management apparatus 4 then sends a request for a terminal measurement report to the radio station 1, and receives the terminal measurement report sent back from the radio station 1. The operation and management apparatus 4 then determines the allocated frequency to the radio station 1 based on the received terminal measurement report. Lastly, the operation and management apparatus 4 notifies the radio station 1 of the allocated frequency.

Figure 5:
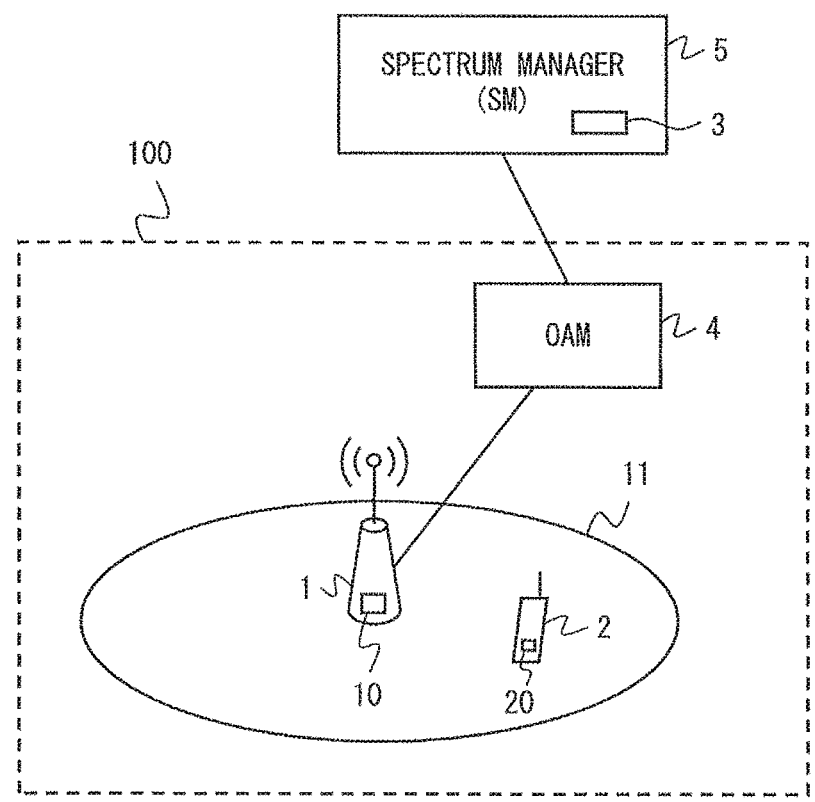
FIG. 5 is a diagram showing another configuration example of the radio communication system according to the first embodiment.

As shown in FIG. 5, the frequency controller 3 may be integrally arranged with the frequency management apparatus 5. The frequency management apparatus 5 is also called a Spectrum Manager (SM) or a frequency management system. The frequency management apparatus 5 manages allocation of the shared frequency to a plurality of radio systems including the radio communication system 100. The plurality of radio systems typically include systems operated by different operators.

Second Embodiment

In this embodiment, an example which is a variation of the first embodiment will be described. The configuration example of the radio communication system 100 according to this embodiment may be similar to the configuration of the first embodiment shown in FIGS. 1, 3, 4, and 5.

Figure 6:
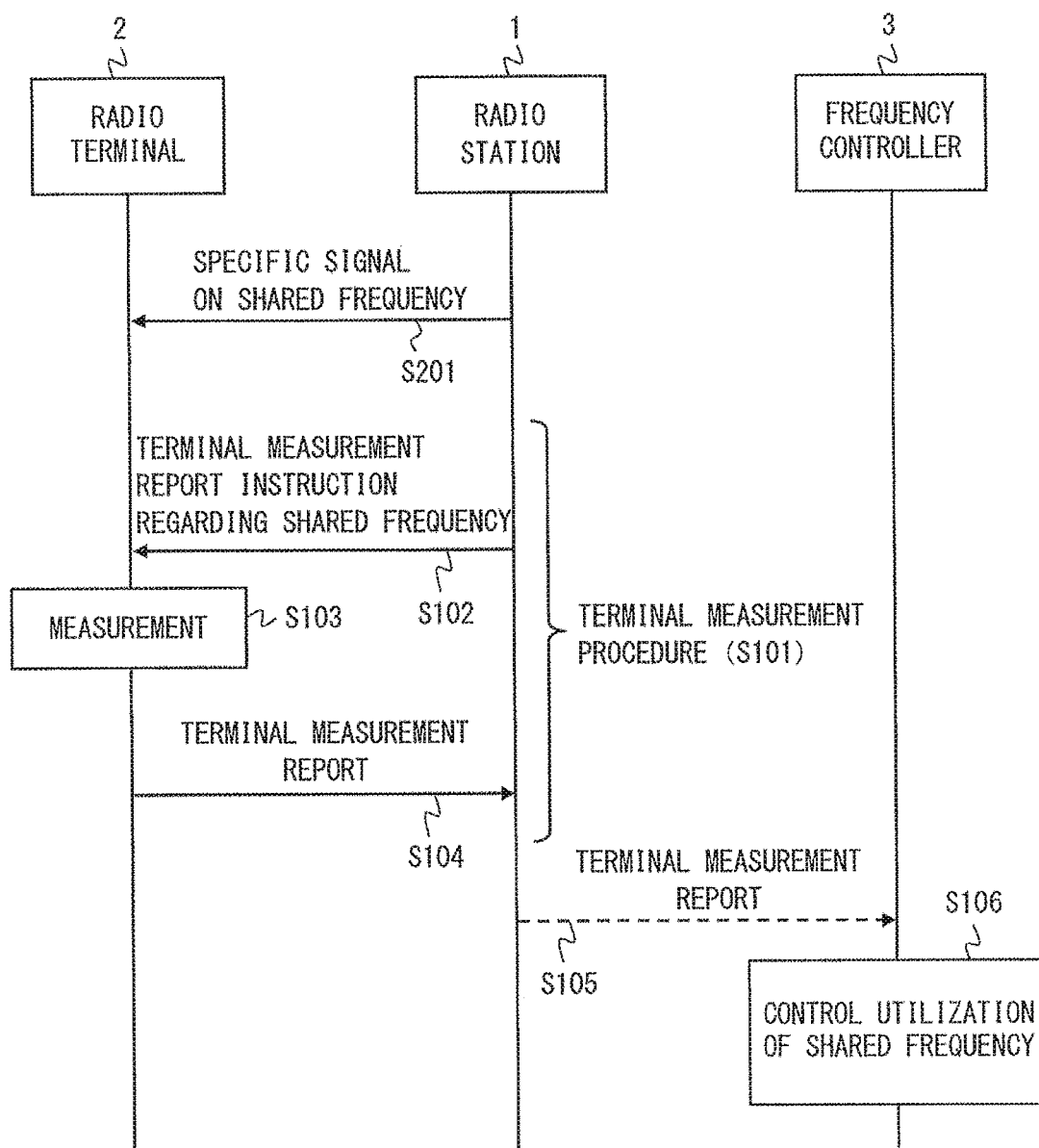
FIG. 6 is a sequence diagram showing a specific example of a procedure for controlling utilization of a shared frequency in a radio communication system according to a second embodiment.

FIG. 6 is a sequence diagram showing a specific example of a procedure for controlling the utilization of the shared frequency in the radio communication system 100 according to this embodiment. As will be clear from the comparison between FIG. 6 and FIG. 2, FIG. 6 includes Step S201. In Step S201, the radio station 1 transmits a specific signal on the shared frequency to carry out the second terminal measurement by the radio terminal 2. The specific signal is transmitted for a predetermined period or until a predetermined timing, and is at least transmitted while the radio terminal 2 performs measurement of the shared frequency (Step S103). In other words, the specific signal is experimentally transmitted before the frequency controller 3 officially allows the utilization of the shared frequency in communication between the radio station 1 and the radio terminal 2. The specific signal may therefore be called a test signal or a training signal. The predetermined period for which the specific signal is transmitted may be called a preliminary operation period, preparation period, or test period to use the shared frequency. The preliminary operation period is a period to determine whether to use the shared frequency or a period to determine whether the shared frequency can be used. Further, the predetermined timing at which the specific signal is transmitted may be, for example, the timing at which the utilization of the shared frequency is determined or the timing at which the utilization of the shared frequency is updated.

Constraints may be imposed on the specific signal compared to a radio signal transmitted in the normal communication between the radio station 1 and the radio terminal 2. For example, the specific signal may not include a data channel signal to transmit user data. In short, the specific signal may not include the data channel signal and may include at least one of a pilot signal, a reference signal, and a synchronization signal.

Constraints may be imposed on transmission power of the specific signal. The specific signal may be transmitted, for example, at a transmission power lower than that of a downlink signal transmitted on the frequency (i.e., licensed band) licensed to the radio communication system 100. Further or alternatively, the specific signal may be transmitted at a transmission power equal to or lower than the upper limit value imposed by a management system of the shared frequency. The management system of the shared frequency is, for example, the frequency management apparatus 5 or a Geo-location Database (GDB).

The processing in Steps S101 to S106 shown in FIG. 6 may be similar to the processing in the steps denoted by the same reference symbols shown in FIG. 2. Note that the measurement report instruction in Step S102 may include configuration information of the specific signal transmitted from the radio station 1.

As described above, in this embodiment, the radio terminal 2 performs the second terminal measurement while the specific signal is being transmitted on the shared frequency from the radio station 1. The radio terminal 2 is therefore able to measure, during the second terminal measurement of the shared frequency, received power or received quality of the specific signal transmitted from the radio station 1. This brings about the following advantages. That is, simple sensing by the radio terminal 2, i.e., measurement of interference power from other radio systems (e.g., primary system) may not be sufficient to determine the frequency suitable for the radio communication system 100. This is because the communication quality (e.g., throughput) when the radio communication system 100 uses the shared frequency depends on received power or received quality at the radio terminal 2 of the shared frequency signal transmitted from the radio station 1. The simple sensing therefore cannot assure that communication quality when the radio communication system 100 uses the shared frequency is sufficient. In contrast, in this embodiment, it is possible to assure that the radio terminal 2 is able to receive the shared frequency signal (i.e., specific signal) from the radio station 1 with sufficient quality, or in other words, to assure that the radio communication system 100 is able to efficiently use the shared frequency.

Third Embodiment

In this embodiment, specific examples of the arrangement of the frequency controller 3 and the procedure for allocating the shared frequency to the radio station 1 described in the first and second embodiments will be described. Specifically, this embodiment shows an example in which the frequency controller 3 is integrally arranged with the radio station 1.

Figure 7:
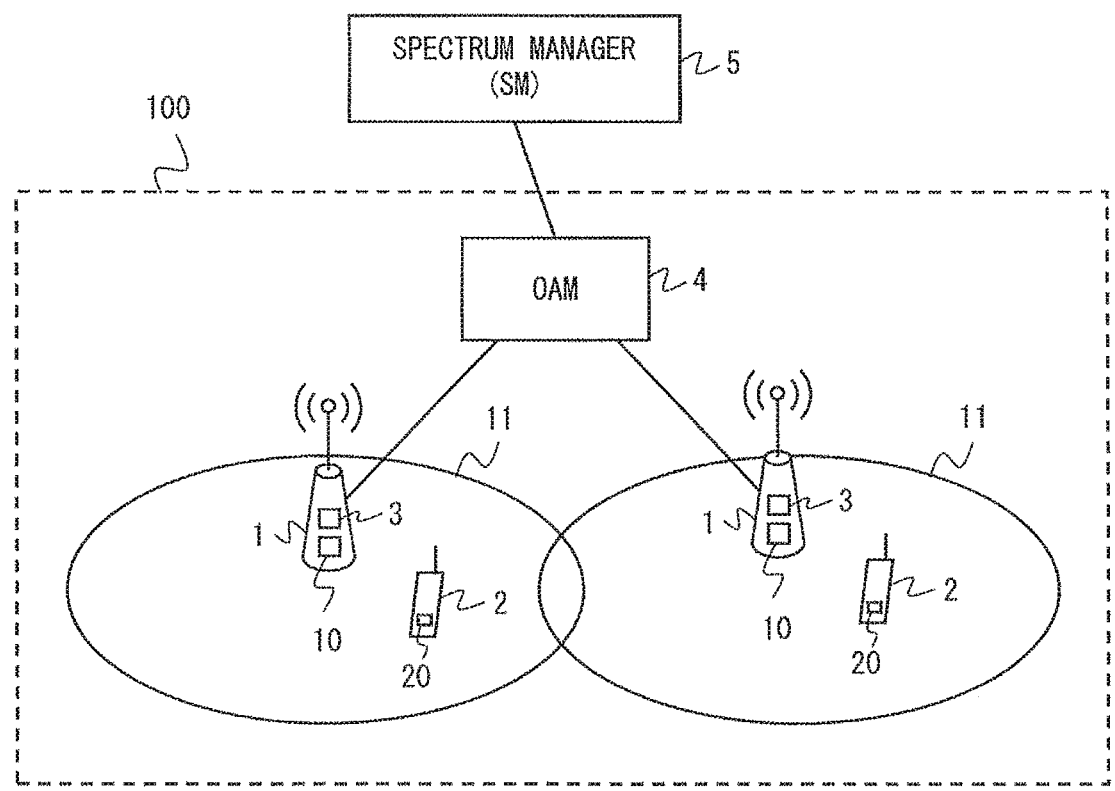
FIG. 7 is a diagram showing a configuration example of a radio network including a radio communication system according to a third embodiment.

FIG. 7 shows a configuration example of a wireless network including a radio communication system 100 according to this embodiment. In the example shown in FIG. 7, the operation management apparatus (OAM) 4 manages a plurality of radio stations 1. The operation management apparatus (OAM) 4 communicates with the frequency management apparatus (SM) 5 and receives shared frequency information from the frequency management apparatus (SM) 5. The shared frequency information indicates an available shared frequency (i.e., at least one candidate frequency). The operation management apparatus (OAM) 4 may receive the shared frequency information directly from the Geo-location Database (GDB) without the intervention of the frequency management apparatus (SM) 5.

Figure 8:
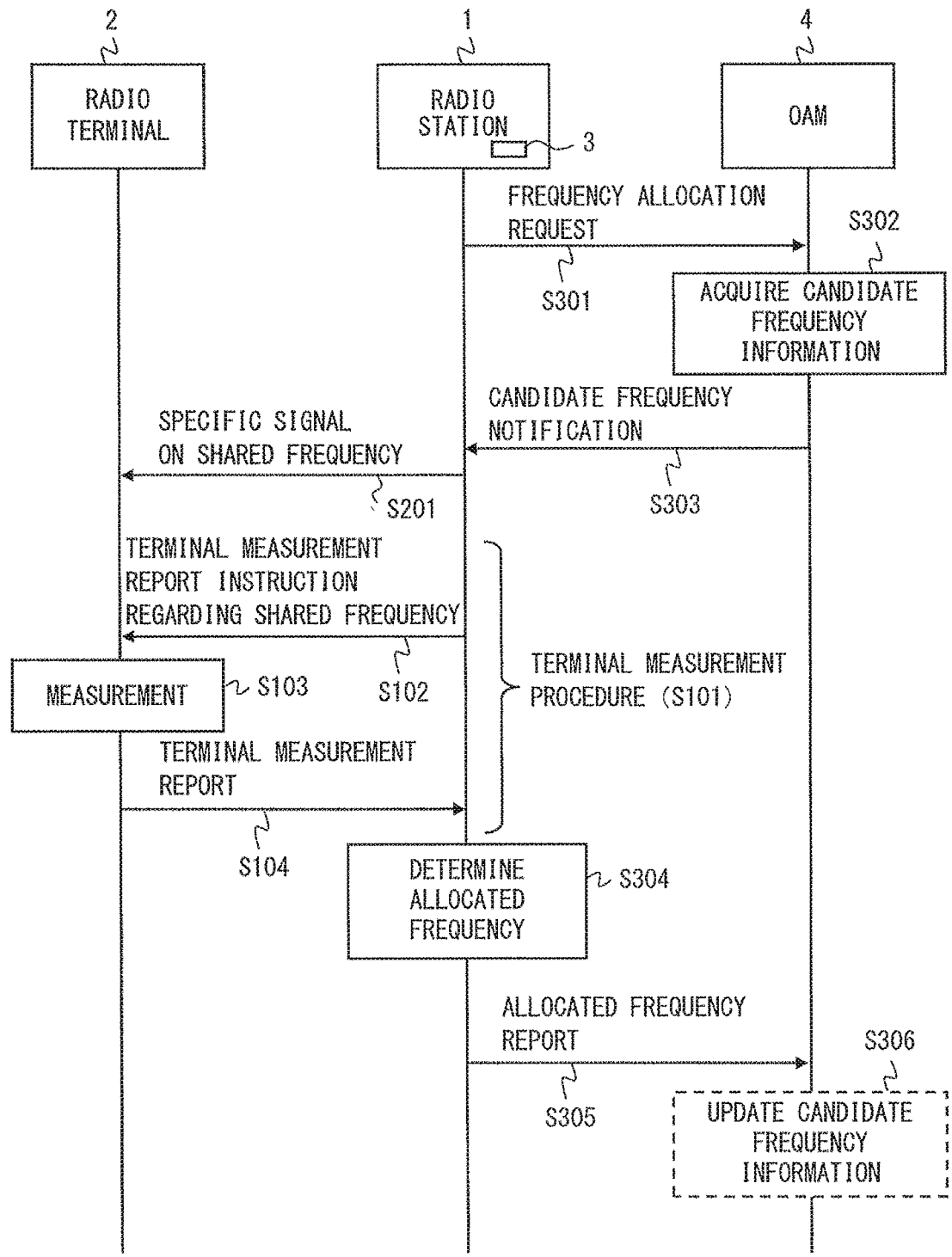
FIG. 8 is a sequence diagram showing a specific example of a procedure for controlling utilization of a shared frequency in the radio communication system according to the third embodiment.

FIG. 8 is a sequence diagram showing a specific example of a procedure for controlling the utilization of the shared frequency in the radio communication system 100 according to this embodiment. In Step S301, the radio station 1 sends a frequency allocation request to the operation management apparatus (OAM) 4. In Step S302, the operation management apparatus (OAM) 4 acquires information of candidate frequencies that can be allocated from the shared frequency. The operation management apparatus (OAM) 4 may receive the information of the candidate frequencies from the frequency management apparatus (SM) 5 or the GDB. In Step S303, the operation management apparatus (OAM) 4 sends a notification indicating at least one candidate frequency to the radio station 1.

The processing in Steps S201 and S101 to S104 shown in FIG. 8 is similar to the processing in the steps denoted by the same reference symbols shown in FIG. 6. Specifically, the radio station 1 and the radio terminal 2 perform the second terminal measurement of the shared frequency (in this example, candidate frequencies) while the specific signal is being transmitted on the shared frequency (candidate frequencies) from the radio station 1. The second terminal measurement is performed using the terminal measurement procedure specified (or defined) by the radio access technology applied to the radio communication system 100 (e.g., LTE, UMTS, CDMA2000, GSM, WiMAX). When there are a plurality of candidate frequencies, the radio station 1 and the radio terminal 2 may perform the second terminal measurement for each of the candidate frequencies.

In Step S304, based on the terminal measurement result of each candidate frequency, the radio station 1 determines the allocated frequency to be used by the radio station 1 from at least one candidate frequency. Specifically, the radio station 1 may select as the allocated frequency a candidate frequency where low interference power from other radio systems and high received quality of the specific signal are measured.

In Step S305, the radio station 1 sends a report indicating the selected allocated frequency to the operation management apparatus (OAM) 4. When none of the candidate frequencies satisfy the determination condition of the allocated frequency, the radio station 1 may send to the operation management apparatus (OAM) 4 a report indicating that frequency allocation is not carried out. In Step S306, the operation management apparatus (OAM) 4 updates the candidate frequency information based on the report from the radio station 1. Note that Step S306 may be omitted.

The procedure shown in FIG. 8 is merely one example. The acquisition of the candidate frequency information by the operation management apparatus (OAM) 4 (S302) may be performed prior to the procedure shown in FIG. 8. Further, instead of sending the frequency allocation request by the radio station 1 (S301), the operation management apparatus (OAM) 4 may autonomously send the candidate frequencies to the radio station 1.

Figure 9:
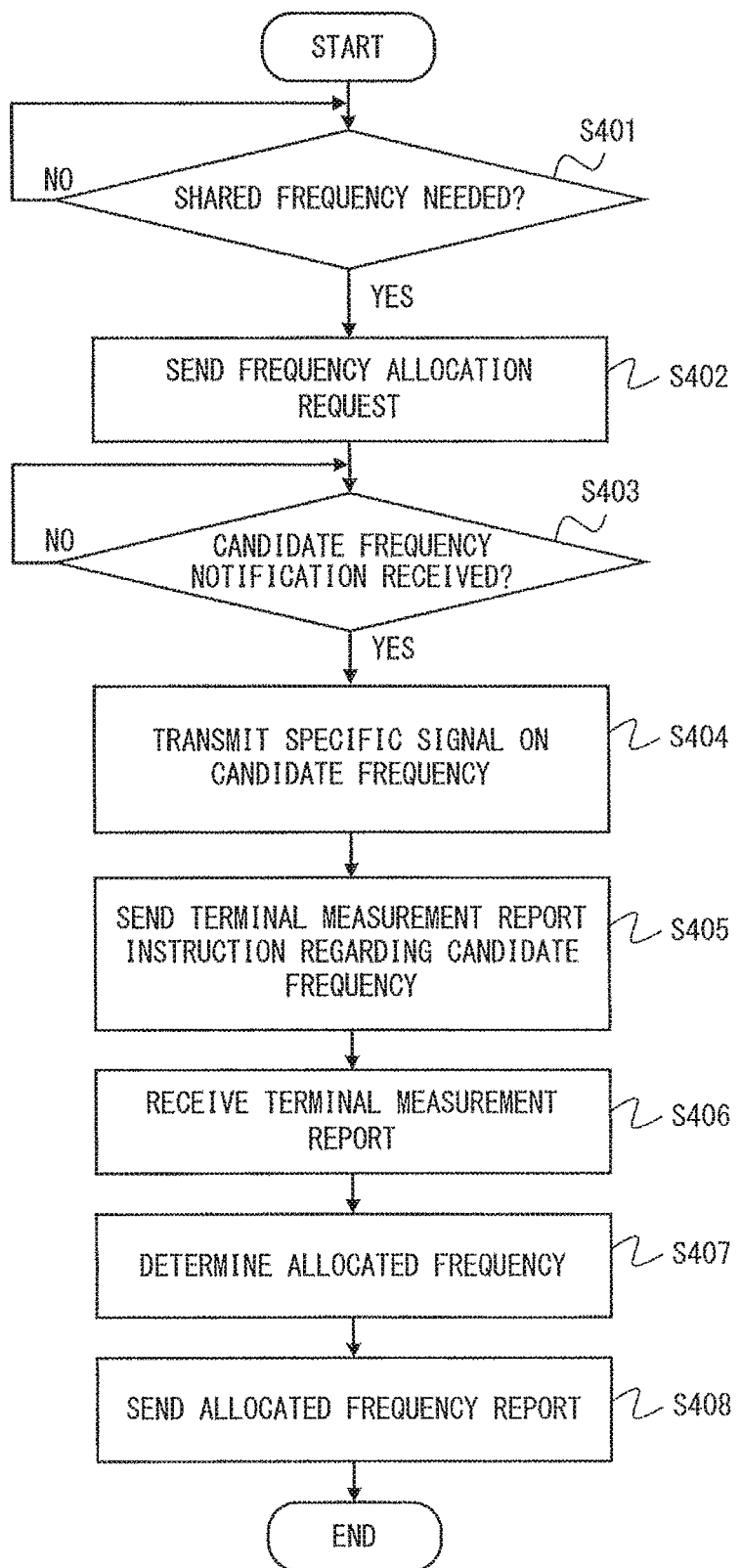
FIG. 9 is a flowchart showing one example of an operation performed by a radio station for controlling utilization of the shared frequency according to the third embodiment.

FIG. 9 is a flowchart showing one example of an operation performed by the radio station 1 for controlling the utilization of the shared frequency. In Step S401, the radio station 1 determines whether allocation of a shared frequency is needed. The radio station 1 may determine that an additional shared frequency is needed when, for example, the load (e.g., amount of communication, the number of radio terminals) of the cell 11 in the licensed band exceeds a predetermined amount. Step S402 corresponds to Step S301 shown in FIG. 8. Specifically, in Step S402, the radio station 1 sends the frequency allocation request to the operation management apparatus (OAM) 4.

Step S403 corresponds to Step S303 shown in FIG. 8. Specifically, in Step S403, the radio station 1 determines whether the radio station 1 has received the candidate frequency notification. Step S404 corresponds to Step S203 shown in FIG. 8. Specifically, when receiving the candidate frequency notification (YES in Step S403), the radio station 1 transmits the specific signal on the candidate frequency. Steps S405 and S406 correspond to the terminal measurement procedure (S101) shown in FIG. 8. Specifically, the radio station 1 sends the instruction for the terminal measurement report regarding the candidate frequency to the radio terminal 2 while transmitting the specific signal on the candidate frequency, and receives the terminal measurement report sent back from the radio terminal 2.

Step S407 corresponds to Step S304 shown in FIG. 8. Specifically, in Step S407, the radio station 1 determines, based on the terminal measurement report, the allocated frequency for its cell 11A from at least one candidate frequency.

Step S408 corresponds to Step S305 shown in FIG. 8. Specifically, in Step S308, the radio station 1A sends the allocated frequency report to the operation management apparatus (OAM) 4. The allocated frequency report indicates the candidate frequency determined as the allocated frequency or indicates that the frequency allocation is not performed.

Similar to the description in the first embodiment, the frequency controller 3 may perform the procedure for releasing the allocated frequency (i.e., procedure for stopping the utilization by the radio station 1 of the shared frequency).

Further, the operation management apparatus (OAM) 4 may notify the radio station 1 of a constraint condition regarding the specific signal (e.g., type of signal to be transmitted, transmission power configuration) when notifying the radio station 1 of the candidate frequencies. Further, the operation management apparatus (OAM) 4 may notify the radio station 1 of the time at which the radio station 1 should perform the second terminal measurement, or the timing or period on which the radio station 1 is permitted to transmit the specific signal. Further, the operation management apparatus (OAM) 4 may notify the radio station 1 of the upper limit value of the downlink transmission power when notifying the radio station 1 of the candidate frequencies. Further, the operation management apparatus (OAM) 4 may notify the radio station 1 of an absolute time or a relative time indicating the time limit that the candidate frequencies can be utilized. These times may either be the same or different for candidate frequencies.

Fourth Embodiment

In this embodiment, specific examples will be described of the arrangement of the frequency controller 3 and the procedure for allocating the shared frequency to the radio station 1 described in the first embodiment. Specifically, this embodiment shows an example in which the frequency controller 3 is integrally arranged with the operation management apparatus (OAM) 4. A configuration example of a wireless network including the radio communication system 100 according to this embodiment may be substantially similar to the configuration example of the second embodiment shown in FIG. 7. The frequency controller 3 is, however, arranged in the operation management apparatus (OAM) 4, not in the radio station 1.

Figure 10:
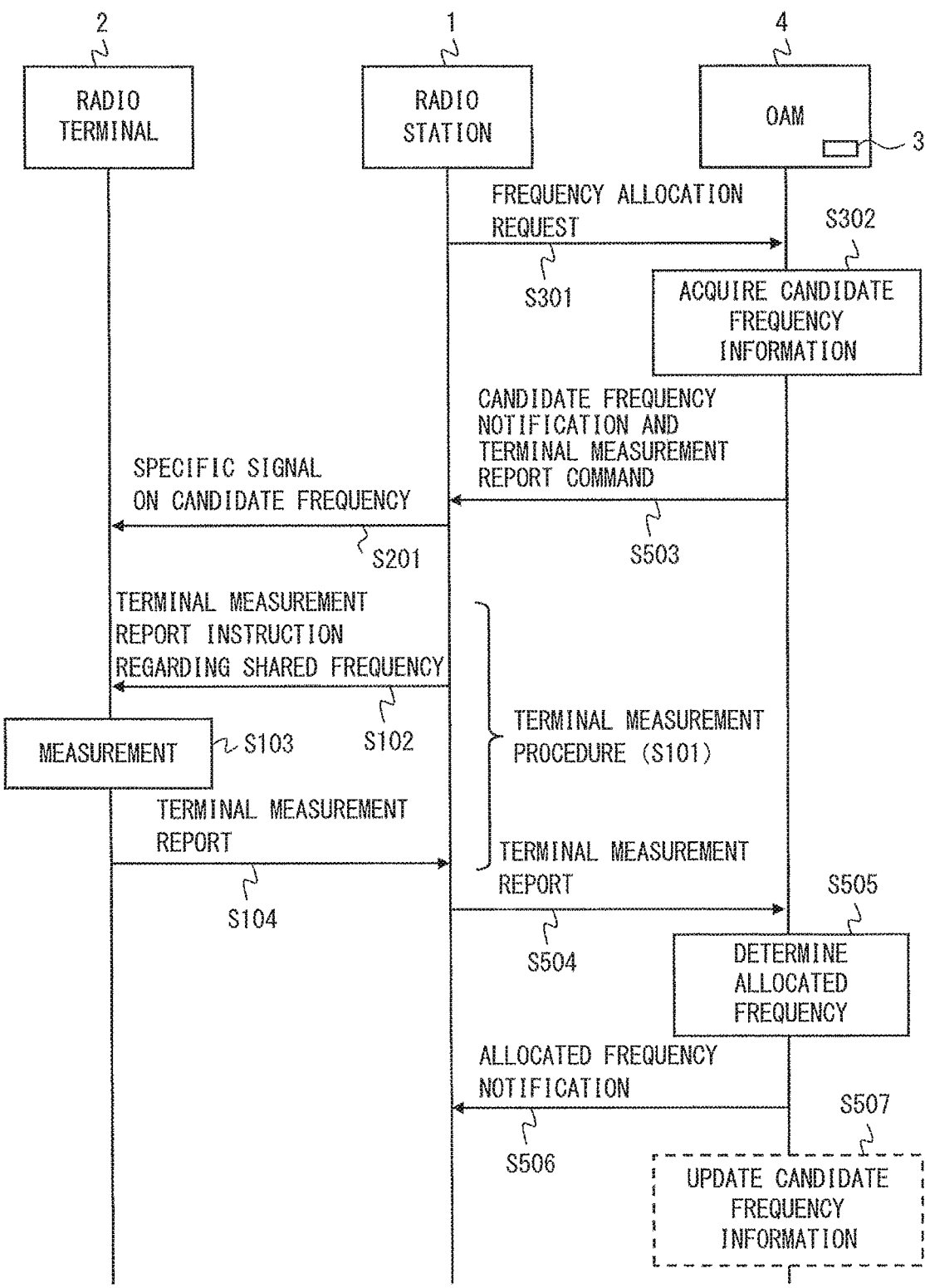
FIG. 10 is a sequence diagram showing a specific example of a procedure performed by a radio communication system for controlling utilization of a shared frequency according to a fourth embodiment.

FIG. 10 is a sequence diagram showing a specific example of the procedure for controlling the utilization of the shared frequency in the radio communication system 100 according to this embodiment. The processing in Steps S301, S302, S201, and S101 to S104 shown in FIG. 10 may be similar to the processing in the steps denoted by the same reference symbols shown in FIG. 8.

In Step S503 in FIG. 10, the operation management apparatus (OAM) 4 sends a command for the terminal measurement report to the radio stations 1A and 1B in addition to the candidate frequency notification. The candidate frequency notification and the terminal measurement report command may be different messages. Further, the terminal measurement report command may not be transmitted explicitly. The candidate frequency notification may be defined as also indicating the command for the terminal measurement report regarding the candidate frequency indicated therein.

In Step S504, in response to the terminal measurement report command from the operation management apparatus (OAM) 4, the radio station 1 sends the terminal measurement report to the operation management apparatus (OAM) 4. In Step S505, the operation management apparatus (OAM) 4 determines the allocated frequency to the radio station 1A. In other words, the operation management apparatus (OAM) 4 determines whether to use the shared frequency for the radio station 1 (or whether to allow the radio station 1 to use the shared frequency). In the determination in Step S505, the terminal measurement report is considered.

In Step S506, the operation management apparatus (OAM) 4 notifies the radio station 1 of the allocated frequency. When none of the candidate frequencies satisfy the condition, the operation management apparatus (OAM) 4 notifies the radio station 1 that the frequency allocation is not performed. In Step S507, the operation management apparatus (OAM) 4 updates the candidate frequency information. Note that Step S507 may be omitted.

The procedure shown in FIG. 10 is merely one example. For example, similar to the description with reference to FIG. 8, the timing of acquiring the candidate frequency information by the operation management apparatus (OAM) 4 (S302) may be changed as appropriate. Further, instead of sending the frequency allocation request by the radio station 1 (S301), the operation management apparatus (OAM) 4 may autonomously send the candidate frequency notification and the terminal measurement report command to the radio station 1.

Figure 11:
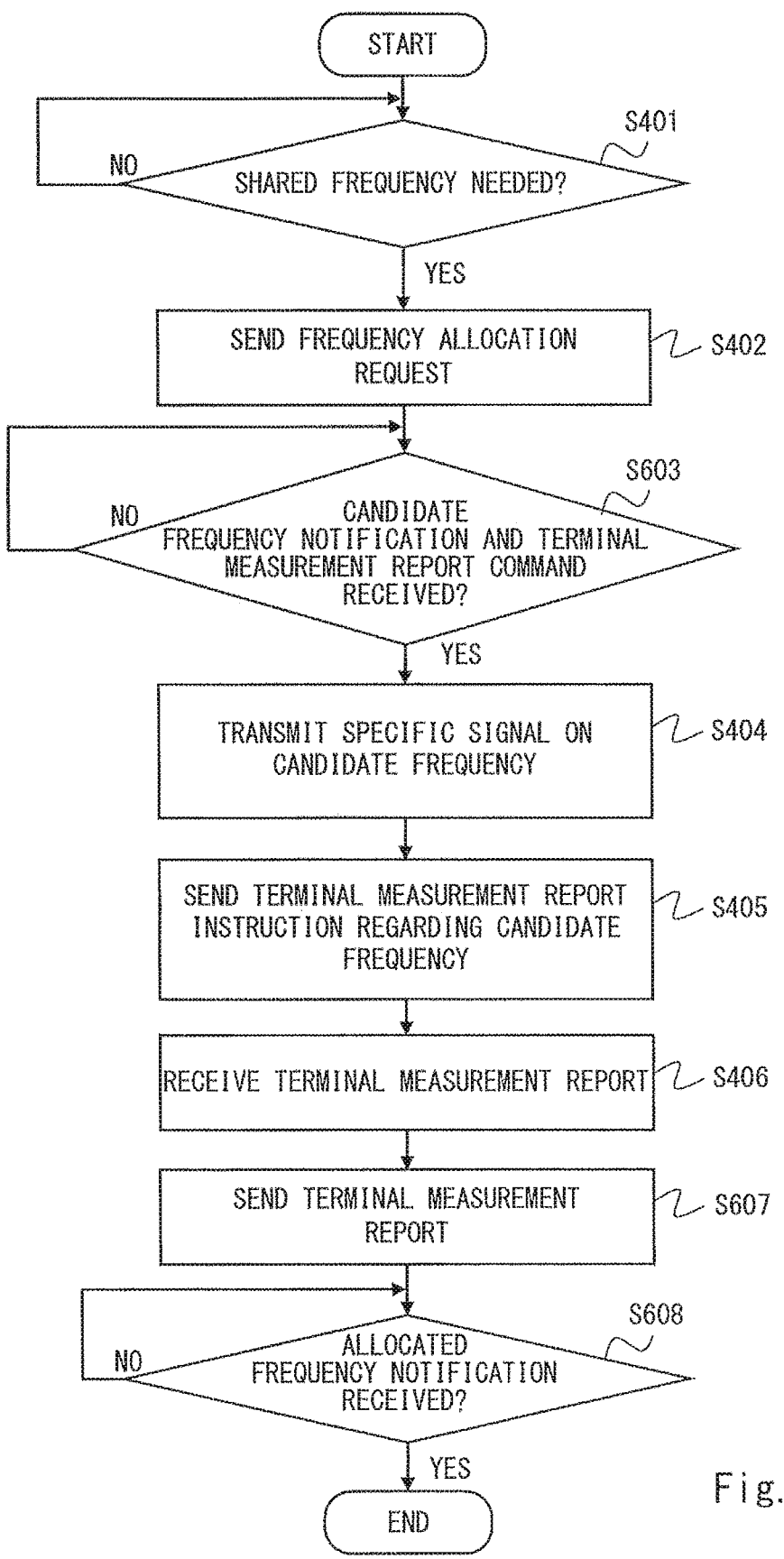
FIG. 11 is a flowchart showing one example of an operation performed by a radio station for controlling utilization of the shared frequency according to the fourth embodiment.

FIG. 11 is a flowchart showing one example of an operation performed by the radio station 1 for controlling the utilization of the shared frequency. The processing in Steps S401, S402, and S404 to S406 shown in FIG. 11 may be similar to the processing in the steps denoted by the same reference symbols shown in FIG. 9.

Step S603 shown in FIG. 11 corresponds to Step S503 shown in FIG. 10. Specifically, in Step S603, the radio station 1 determines whether the radio station 1 has received the candidate frequency notification and the terminal measurement report command. When the radio station 1 has received the candidate frequency notification and the terminal measurement report command (YES in Step S603), the radio station 1 controls the terminal measurement of the candidate frequency while transmitting the specific signal (Steps S404 to S406).

Steps S607 and S608 in FIG. 11 correspond to Steps S504 and S505 in FIG. 10. Specifically, the radio station 1A sends the terminal measurement report to the operation management apparatus (OAM) 4 (Step S607). In Step S608, the radio station 1 determines whether the radio station 1 has received the notification of the allocated frequency. When the radio station 1 has received the notification of the allocated frequency (YES in Step S608), the radio station 1 may configure the cell 11A using the allocated frequency to start communication with the radio terminal 2.

Figure 12:
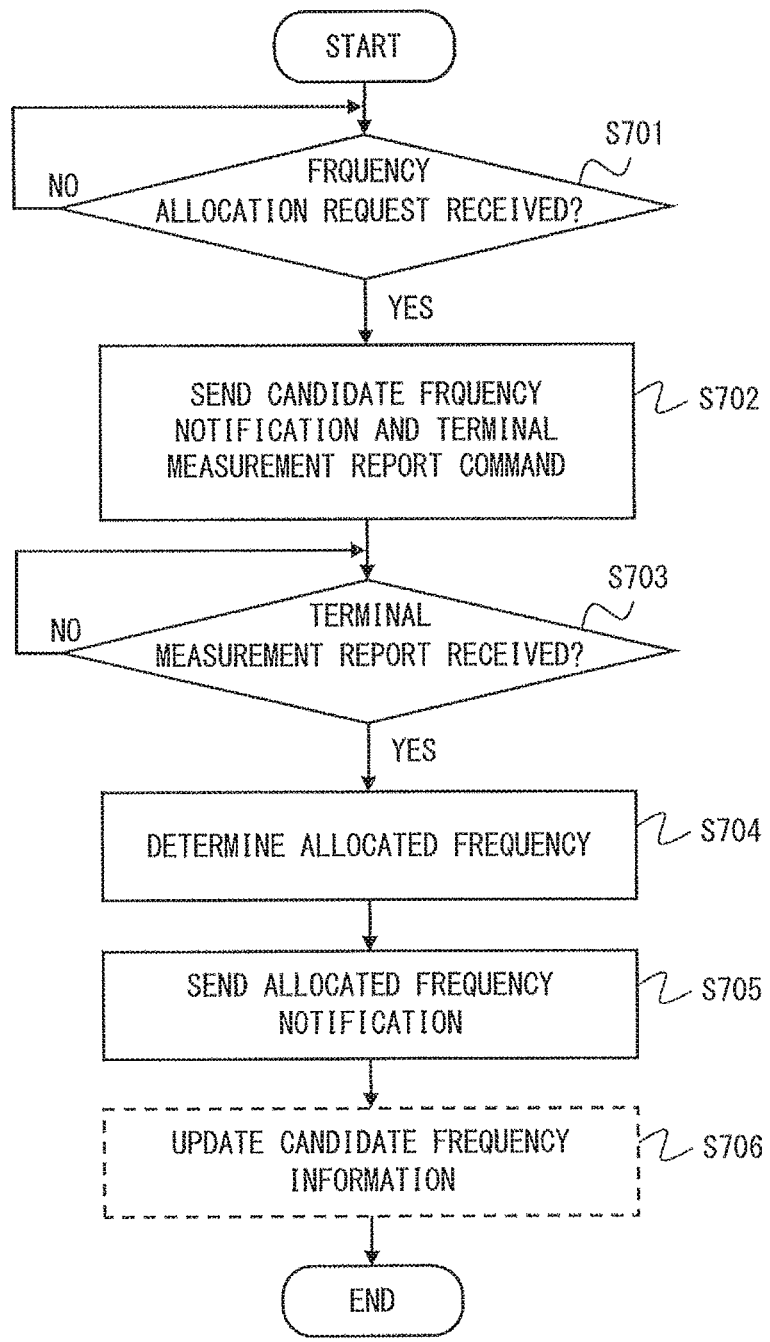
FIG. 12 is a flowchart showing one example of an operation performed by an operation management apparatus (OAM) for controlling utilization of the shared frequency by according to the fourth embodiment.

FIG. 12 is a flowchart showing one example of an operation performed by the operation and management apparatus (OAM) 4 for controlling the utilization of the shared frequency. Step S701 corresponds to Step S301 in FIG. 10. Specifically, the operation management apparatus (OAM) determines whether the OAM has received the frequency allocation request from the radio station 1 (Step S301). Steps S702 and S703 correspond to Steps S503 and S504 in FIG. 10. Specifically, the operation management apparatus (OAM) 4 sends the candidate frequency notification and the terminal measurement report command (Step S702). The operation management apparatus (OAM) 4 then determines whether the OAM 4 has received the terminal measurement report (Step S703).

Steps S704 to S706 in FIG. 12 correspond to Steps S505 to S507 in FIG. 10. Specifically, in Step S704, the operation management apparatus (OAM) 4 determines, based on the terminal measurement report received from the radio station 1, the allocated frequency to the radio station 1 from at least one candidate frequency. In Step S705, the operation management apparatus (OAM) 4 sends the allocated frequency notification to the radio station 1. In Step S706, the operation management apparatus (OAM) 4 updates the candidate frequency information according to the allocation of a candidate frequency to the radio station 1.

Fifth Embodiment

In this embodiment, a case will be described in detail in which the radio communication system 100 according to the first to fourth embodiments is an LTE system. When the radio communication system 100 is an LTE system, the radio station 1 corresponds to a radio base station (i.e., eNB) and the radio terminal 2 corresponds to a UE. The terminal measurement procedure described in the first to fourth embodiments may be referred to as a UE measurement procedure.

In this embodiment, the terminal measurement report may include, for example, at least one of the following (1a) to (1e):

(1a) Received power (Reference Signal Received Power (RSRP)) or received strength (Received Signal Strength Indicator (RSSI)) of a signal of the LTE system 100 in the shared frequency;

(1b) Received quality (Reference Signal Received Quality (RSRQ)) of a signal of the radio communication system 100 in the shared frequency;

(1c) Communication path quality (Channel Quality Indicator (CQI) or Channel State Information (CSI)) of the LTE system 100 in the shared frequency;

(1d) Information regarding the shared frequency (e.g., preferred frequency, priority); and (1e) Received power (Received Interference Power) or received strength (Received Interference Signal Strength) of a signal from the primary system in the shared frequency.

Further, in this embodiment, the eNB 1 may send the terminal measurement report instruction to the UE 2 by using an RRC Connection Reconfiguration. Further, the UE 2 may send the terminal measurement report to the eNB 1 as a (UE) Measurement Report.

Figure 13:
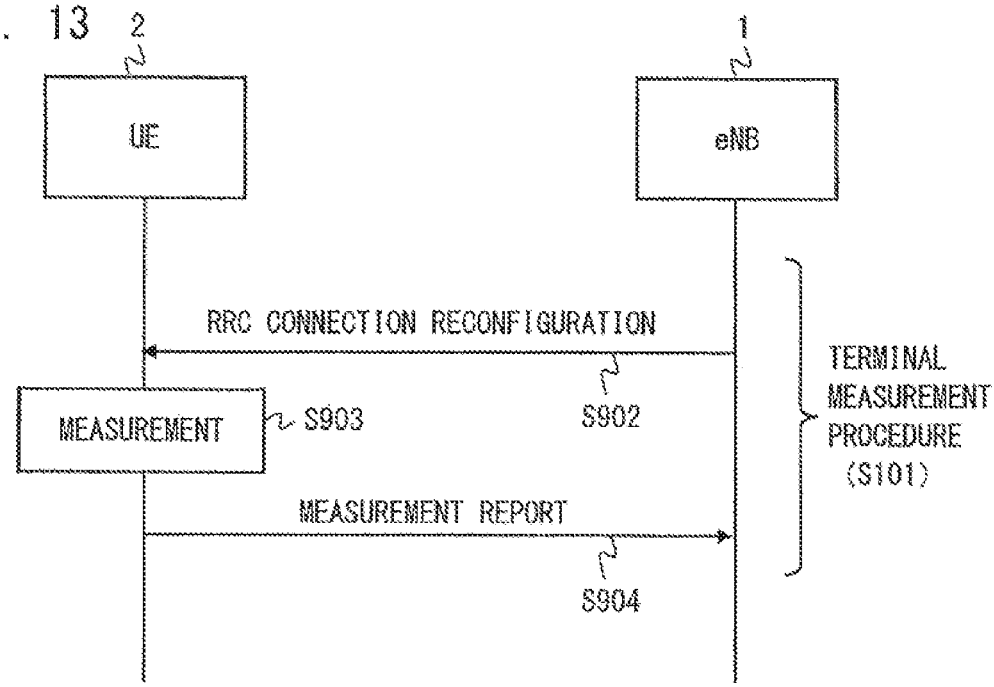
FIG. 13 is a sequence diagram showing a specific example of a terminal measurement procedure in a shared frequency performed by a radio communication system according to a fifth embodiment.

FIG. 13 is a sequence diagram showing a specific example of the terminal measurement procedure in this embodiment. In Step S902 in FIG. 13, the eNB 1 sends an RRC Connection Reconfiguration message to the UE 2. In Step S903, the UE 2 performs measurement of the shared frequency in accordance with the configuration information (Measurement Configuration) of the terminal measurement indicated by the RRC Connection Reconfiguration. In Step S903, the UE 2 sends to the eNB 1 a (UE) Measurement Report indicating the measurement results of the shared frequency.

Further, in this embodiment, the terminal measurement procedure for performing the second terminal measurement of the shared frequency may include at least one of the following (2a) to (2e):

(2a) an inter-frequency measurement procedure;
(2b) an inter-radio access technology measurement (inter-RAT measurement) procedure;
(2c) a procedure for measuring the shared frequency configured as an additional carrier using a second receiver installed in the UE 2 having a dual receiver configuration;
(2d) a procedure for measuring the shared frequency configured as a secondary cell (or secondary carrier) of carrier aggregation (CA); and
(2e) a terminal measurement procedure of a Minimization of Drive Test (MDT).

Figure 14:
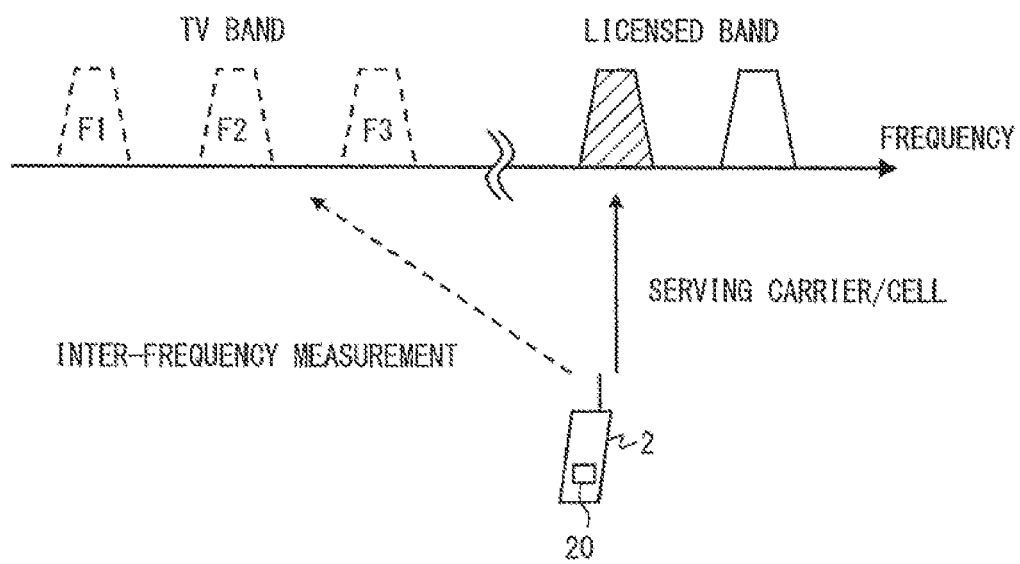
FIG. 14 is a diagram showing a first specific example of measurement performed by a radio terminal according to the fifth embodiment.

FIG. 14 is a conceptual diagram of the procedure (2a) using the inter-frequency measurement for the second terminal measurement of the shared frequency. FIG. 14 shows a case in which the shared frequency is TVWS. The UE 2 carries out measurement of the licensed band configured as a serving carrier or a serving cell. Further, the UE 2 carries out measurement of the TV band in accordance with the instruction from the eNB 1 for the inter-frequency measurement.

The inter-frequency measurement may be carried out according to the sequence diagram shown in FIG. 13. Specifically, the RRC Connection Reconfiguration message shown in Step S902 includes measurement configuration information (Measurement Configuration (MeasConfig)) of Inter-frequency measurement. Further, this measurement configuration information includes, for example, at least one of the following three types of information:

Measurement items (e.g., RSRP, RSRQ, RSSI, or CQI);
Configuration information of a communication interruption period for the inter-frequency measurement (Measurement Gap Configuration (MeasGapConfig)); and
Configuration information regarding report (Report Configuration (ReportConfig)).

Figure 15:
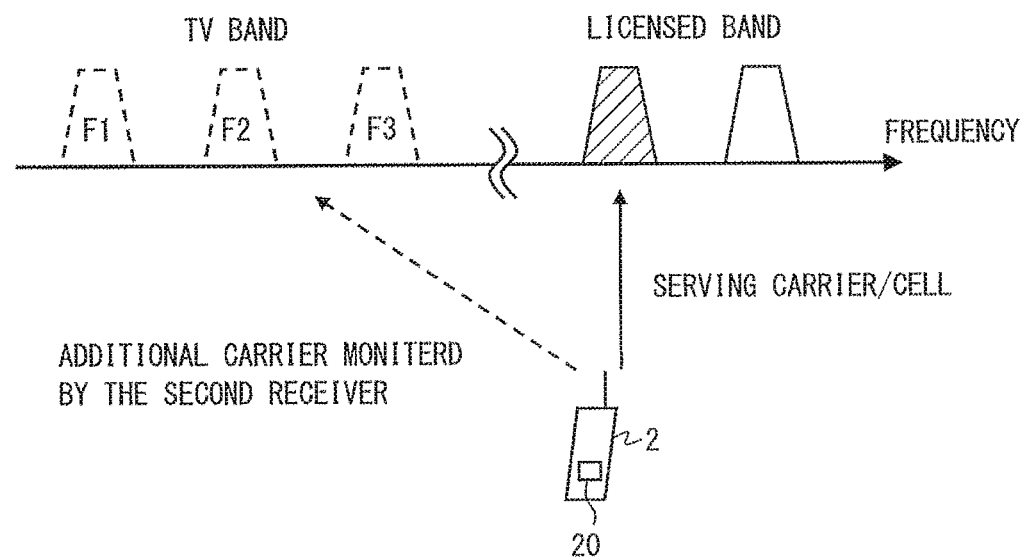
FIG. 15 is a diagram showing a second specific example of measurement performed by a radio terminal according to the fifth embodiment.

FIG. 15 is a conceptual diagram of the procedure (2c). FIG. 15 also shows a case in which the shared frequency is TVWS. The UE 2 carries out measurement of the licensed band configured as a serving carrier or a serving cell. Further, the UE 2 receives and measures, using the second receiver, the TV band configured as an additional carrier, in accordance with the instruction from the eNB 1.

The measurement of the shared frequency based on the procedure (2c) can also be carried out according to the sequence diagram shown in FIG. 13. Specifically, the RRC Connection Reconfiguration message in Step S902 includes the measurement configuration information (Measurement Configuration (MeasConfig)) of the inter-frequency measurement. The specific example of the measurement configuration information is the same as described above. In this example, the UE 2 notifies the eNB 1 in advance that the UE 2 has a dual receiver configuration (in other words, it has a second receiver). The eNB 1 therefore recognizes that the UE 2 is able to carry out the terminal measurement of the shared frequency using the second receiver. In Step S903, the UE 2 performs measurement of the shared frequency as the intra-frequency or the inter-frequency measurement. The eNB 1 and the UE 2 may perform measurement of the shared frequency as the inter-RAT measurement.

Figure 16:
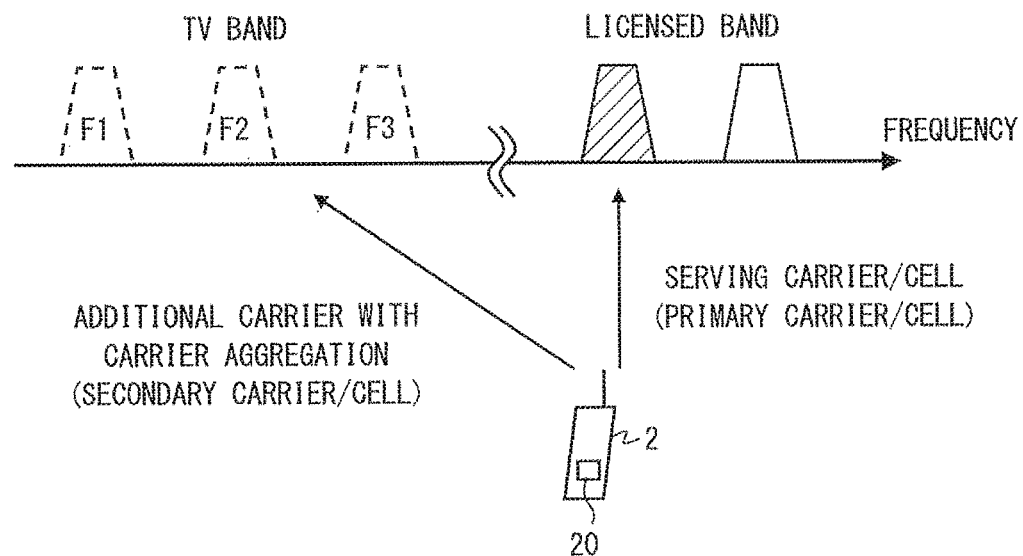
FIG. 16 is a diagram showing a third specific example of measurement performed by a radio terminal according to the fifth embodiment.

FIG. 16 is a conceptual diagram of the procedure (2d) for measuring the shared frequency configured as a secondary cell (or a secondary carrier) of carrier aggregation (CA). FIG. 16 also shows a case in which the shared frequency is TVWS. The UE 2 carries out measurement of the licensed band configured as a primary cell (or primary carrier) of the carrier aggregation (CA). Further, the UE 2 configures, in accordance with the instruction from the eNB 1, a cell (or carrier) using the TV band as the secondary cell (or secondary carrier) of the carrier aggregation (CA). The UE 2 then receives the specific signal and carries out the terminal measurement of the TV band. When the shared frequency includes a plurality of candidate frequencies, the eNB 1 may configure the plurality of candidate frequencies as the secondary cell one by one, or may concurrently configure the plurality of candidate frequencies as a plurality of secondary cells.

The measurement of the shared frequency using the carrier aggregation (CA) may also be carried out according to the sequence diagram shown in FIG. 13. Specifically, the RRC Connection Reconfiguration message in Step S902 includes the measurement configuration information (Measurement Configuration (MeasConfig)) and the configuration information (Secondary Cell Configuration (SCellConfig)) of the secondary cell (or secondary carrier) of the carrier aggregation (CA). In Step S903, the UE 2 carries out measurement of the shared frequency as the intra-frequency or the inter-frequency measurement. The secondary cell configuration information (SCellConfig) includes, for example, a list of the secondary cells to be added or modified (SCellToAddModList). The secondary cell list (SCellToAddModList) includes at least one of the following three items:
- Index of the secondary cells (SCellIndex);
- Frequency information (Absolute Radio Frequency Channel Number (ARFCN)); and
- Radio resource configuration (Radio Resource Config).

The procedure (2b) using the inter-radio access technology measurement (inter-RAT measurement) for the second terminal measurement of the shared frequency can also be performed according to the sequence diagram shown in FIG. 13. More specifically, the RRC Connection Reconfiguration message in Step S902 includes the measurement configuration information (Measurement Configuration (MeasConfig)) of the inter-RAT measurement. The specific example of the measurement configuration information of the inter-RAT measurement is similar to that of the inter-frequency measurement described above.

In this embodiment, the eNB 1 may transmit the specific signal described in the second embodiment. The specific signal transmitted on the shared frequency from the eNB 1 may include at least one of a pilot signal, a reference signal, and a synchronization signal instead of including the data channel signal. For example, the specific signal may only include at least one of the following (3a) to (3c):

(3a) a reference signal common to a cell (Common Reference Signal (CRS));
(3b) a reference signal for calculating CSI (CSI Reference Signal (CSI-RS); and
(3c) a synchronization signal.

The specific signal may further include (3d) system control information common to a cell (Master Information Block (MIB) or System Information Block (SIB)).

Further, a constraint may be imposed on the transmission power of the specific signal. For example, the specific signal may be transmitted at a transmission power lower than that of the downlink signals transmitted on the licensed band of the LTE system 100. Further, the specific signal may be transmitted at a transmission power equal to or lower than the upper limit value imposed by the management system (e.g., GDB, SM) of the shared frequency.

Sixth Embodiment

In this embodiment, a case will be described in detail in which the radio communication system 100 according to the third embodiment is an LTE system and the shared frequency is TVWS. That is, this embodiment shows an example in which the frequency controller 3 is integrally arranged with the radio station (i.e., eNB) 1.

Figure 17:
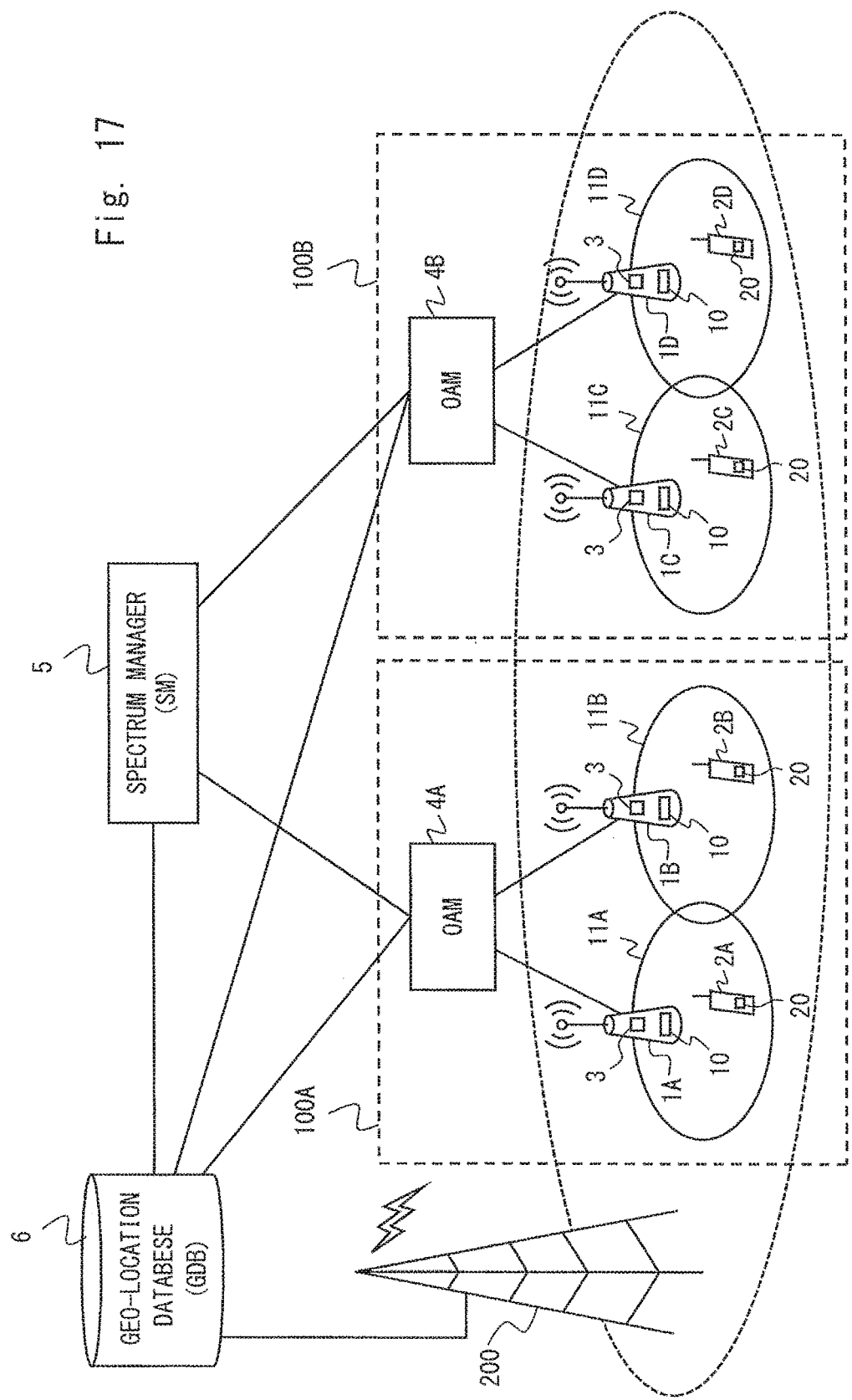
FIG. 17 is a diagram showing a configuration example of a radio network including a radio communication system according to a sixth embodiment.

FIG. 17 shows a configuration example of a wireless network including a radio communication system (i.e., LTE system) 100 according to this embodiment. The example shown in FIG. 17 includes two LTE systems 100A and 100B. The LTE system 100A includes two eNBs 1A and 1B. The eNB 1A operates a cell 11A and communicates with a UE 2A belonging to the cell 11A. The eNB 1B operates a cell 11B and communicates with a UE 2B belonging to the cell 11B. An operation management apparatus (OAM) 4A manages a plurality of radio stations 1 (including the eNBs 1A and 1B) included in the LTE system 100A.

Similarly, the LTE system 100B includes two eNBs 1C and 1D. The eNB 1C operates a cell 11C and communicates with a UE 2C belonging to the cell 11C. In a similar way, the eNB 1D operates a cell 11D and communicates with a UE 2D belonging to the cell 11D. An operation management apparatus (OAM) 4B manages a plurality of radio stations 1 (including the eNBs 1C and 1D) included in the LTE system 100B.

The operation management apparatuses (OAMs) 4A and 4B communicate with the frequency management apparatus (SM) 5 and receive the shared frequency information from the frequency management apparatus (SM) 5. The shared frequency information indicates an available shared frequency (i.e., at least one candidate frequency). The operation management apparatuses (OAMs) 4A and 4B may directly receive the shared frequency information from the Geo-location Database (GDB) 6 without the intervention of the frequency management apparatus (SM) 5. The GDB 6 manages the state of utilization of the frequency band (i.e., TV band) licensed to a TV broadcasting system 200, and provides information of a frequency band (e.g., TVWS) which can be secondarily used.

Figure 18:
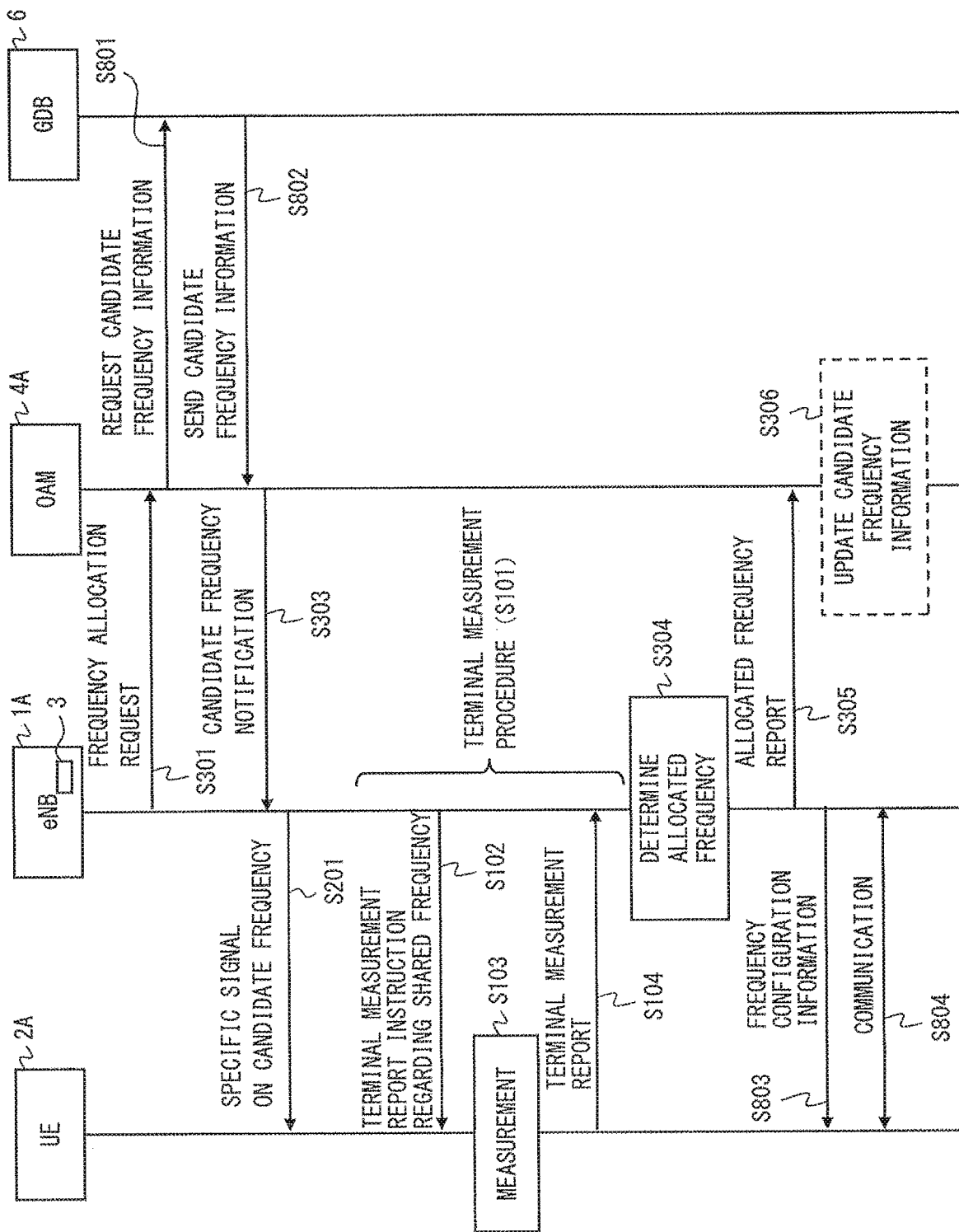
FIG. 18 is a sequence diagram showing a specific example of a procedure performed by the radio communication system for controlling utilization of a shared frequency according to the sixth embodiment.

FIG. 18 is a sequence diagram showing a specific example of a procedure for controlling the utilization of the shared frequency in the LTE system 100A according to this embodiment. While the eNB 1A is shown in FIG. 18, the operation of the eNB 1B is similar to that of the eNB 1A. Further, the LTE system 100B may perform a procedure similar to that in the LTE system 100A shown in FIG. 18.

The processing in Steps S101 to S104, S201, S301, and S303 to S306 shown in FIG. 18 may be to the same as the processing in the steps denoted by the same reference symbols shown in FIG. 8. Steps S801 and S802 shown in FIG. 18 are specific examples of the acquisition of the candidate frequency information (Step S302) shown in FIG. 8. Specifically, in Step S801, the operation management apparatus (OAM) 4A sends to the GDB 6 a request for candidate frequency information. In Step S802, the operation management apparatus (OAM) 4A receives the notification including the candidate frequency information from the GDB 6. The candidate frequency information indicates at least one candidate frequency.

Steps S803 and S804 in FIG. 18 indicate processing to start communication using the allocated frequency (i.e., TVWS). In Step S803, the eNB 1A sends the configuration information of the allocated frequency to the UE 2A. In Step S804, the eNB 1A communicates with the UE 2A on the allocated frequency.

The procedure shown in FIG. 18 is merely one example. Similar to the description with reference to FIG. 8, the timing of acquiring the candidate frequency information by the operation management apparatus (OAM) 4A (S801 and S802) may be changed as appropriate. Further, instead of sending the frequency allocation request from the eNB 1 (S301), the operation management apparatus (OAM) 4 may autonomously notify the eNB 1 of the candidate frequencies.

Seventh Embodiment

In this embodiment, a case will be described in detail in which the radio communication system 100 according to the fourth embodiment described above is an LTE system and the shared frequency is TVWS. That is, in this embodiment, an example is shown in which the frequency controller 3 is integrally arranged with the operation management apparatus (OAM) 4. The configuration example of the radio network including the LTE system 100 according to this embodiment may be substantially similar to the configuration example of the sixth embodiment shown in FIG. 17. The frequency controller 3 is, however, arranged in the operation management apparatus (OAM) 4, not in the radio station (i.e., eNB) 1.

Figure 19:
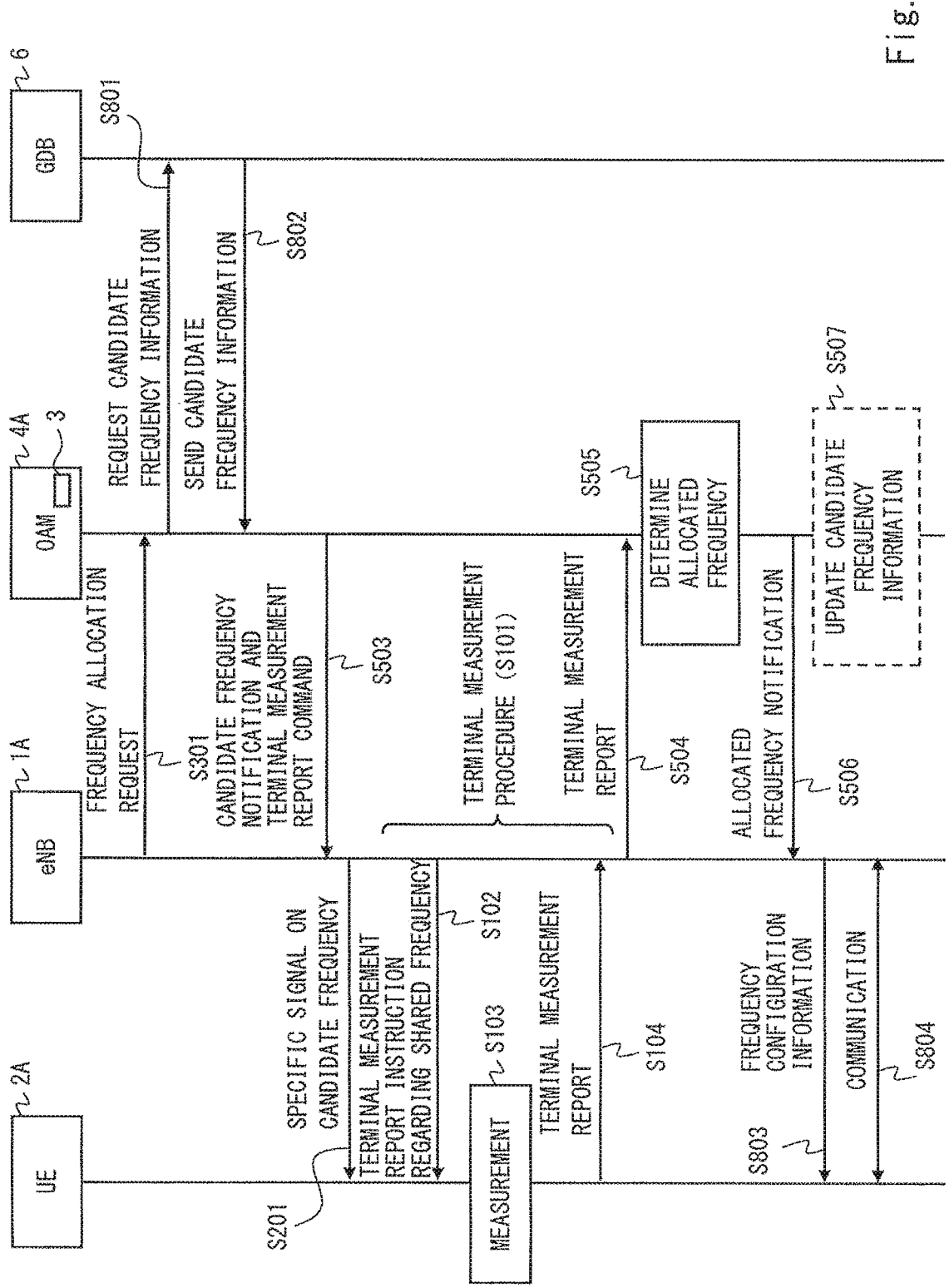
FIG. 19 is a sequence diagram showing a specific example of a procedure performed by a radio communication system for controlling utilization of a shared frequency according to a seventh embodiment.

FIG. 19 is a sequence diagram showing a specific example of a procedure for controlling the utilization of the shared frequency in the LTE systems 100A and 100B according to this embodiment. While the eNB 1A is shown in FIG. 19, the operation of the eNB 1B is similar to that of the eNB 1A. Further, the LTE system 100B may perform a procedure similar to that performed in the LTE system 100A shown in FIG. 19. The processing in the steps shown in FIG. 19 may be to the same as the processing in the steps denoted by the same reference symbols shown in FIG. 10 or FIG. 18. Therefore, the detailed description regarding each step of FIG. 19 will be omitted here.

The procedure shown in FIG. 19 is merely one example. Similar to the description with reference to FIG. 10, for example, the timing of acquiring the candidate frequency information by the operation management apparatus (OAM) 4 (S302) may be changed as appropriate. Further, instead of sending the frequency allocation request from the eNB 1 (S301), the operation management apparatus (OAM) 4 may autonomously send to the eNB 1 the candidate frequency notification and the terminal measurement report command.

Eighth Embodiment

The seventh embodiment described above may be modified as described below. In the seventh embodiment, the example is shown in which the operation management apparatuses (OAMs) 4A and 4B of each operator select the allocated frequency from the candidate frequencies (i.e., TVWS). However, the frequency management apparatus (SM) 5 may perform frequency allocation (i.e., frequency management) for the plurality of operator networks.

Figure 20:
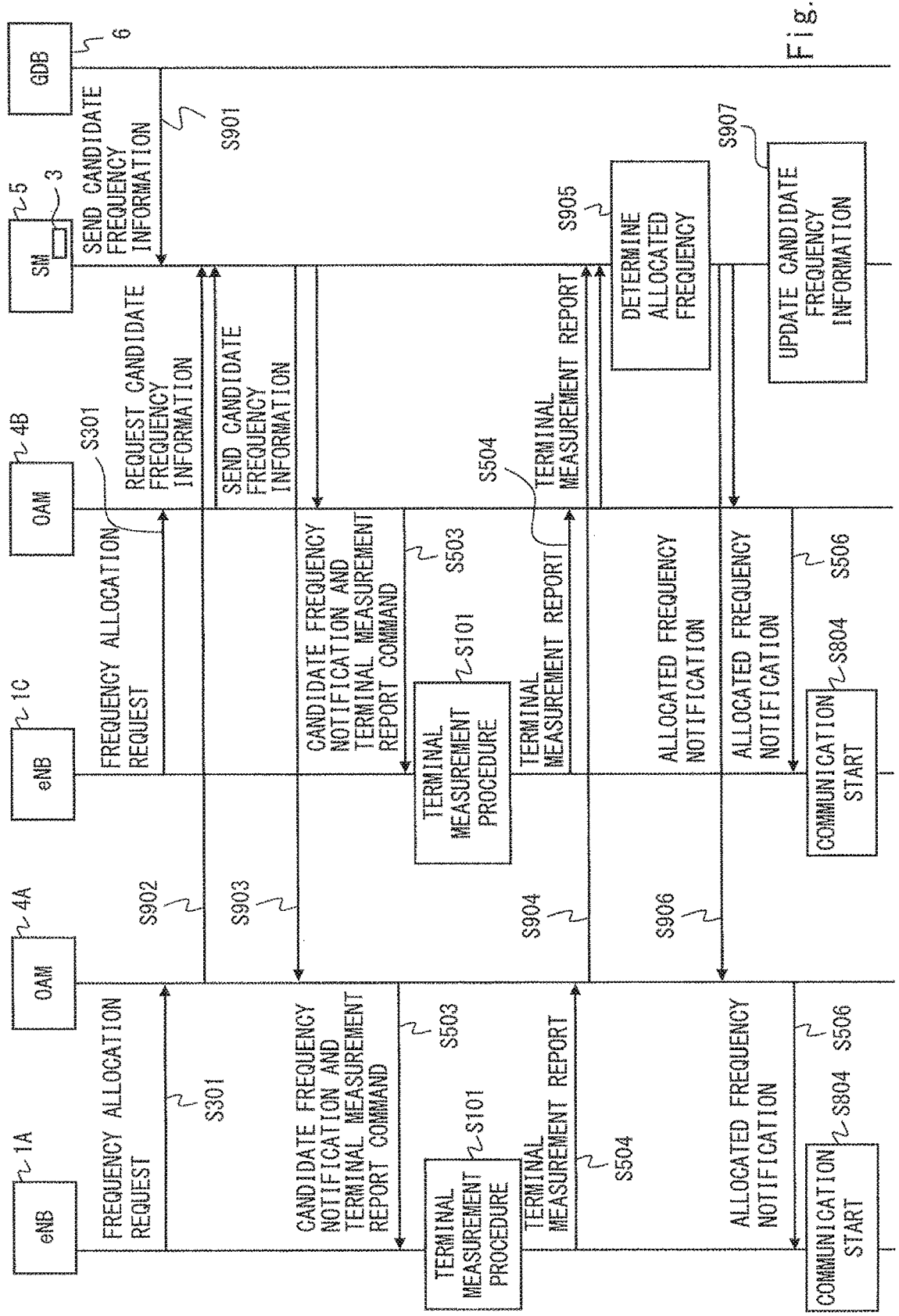
FIG. 20 is a sequence diagram showing a specific example of a procedure performed by a radio communication system for controlling utilization of a shared frequency according to an eighth embodiment.

FIG. 20 is a sequence diagram showing a specific example of the procedure for controlling the utilization of the shared frequency in the LTE systems 100A and 100B according to this embodiment. While the eNBs 1A and 1C are shown in FIG. 21, the operations of the eNBs 1B and 1D are similar to those of the eNBs 1A and 1C. As will be clear from the comparison between FIG. 20 and FIG. 19, FIG. 20 includes Step S901. In Step S901, the frequency management apparatus (SM) 5 receives from the GDB 6 information of the TVWS that can be secondarily used, i.e., information of the candidate frequencies.

Further, FIG. 20 includes Steps S902 and S903 in place of Steps S801 and S802 shown in FIG. 19. In Step S902, the operation management apparatuses (OAMs) 4A and 4B send the frequency allocation request to the frequency management apparatus (SM) 5 in response to receiving the frequency allocation request (S301) from the eNBs 1A and 1C. The operation management apparatuses (OAMs) 4A and 4B may transfer the frequency allocation request message from the eNBs 1A and 1C to the frequency management apparatus (SM) 5. In Step S903, the operation management apparatuses (OAMs) 4A and 4B receive notification including the candidate frequency information from the frequency management apparatus (SM) 5.

Further, FIG. 20 includes Steps S904 to S906 in place of Step S505 shown in FIG. 19. In Step S904, the operation management apparatuses (OAMs) 4A and 4B send the terminal measurement report to the frequency management apparatus (SM) 5. In Step S905, the frequency management apparatus (SM) 5 determines the allocated frequency allocated to each of the eNBs 1A and 1C based on the terminal measurement report. In Step S906, the frequency management apparatus (SM) 5 sends notification indicating the allocated frequency allocated to each of the eNBs 1A and 1C to each of the management apparatuses (OAMs) 4A and 4B.

Furthermore, FIG. 20 includes Step S907 in place of Step S507 shown in FIG. 19. In Step S907, the frequency management apparatus (SM) 5 updates the candidate frequency information to reflect the results of allocating the candidate frequency to each of the eNBs 1A and 1C.

The procedure shown in FIG. 20 is merely one example. For example, the timing of acquiring the candidate frequency information from the GDB 6 by the frequency management apparatus (SM) 5 may be changed as appropriate. Further, instead of sending the frequency allocation request from the eNB 1 (S301), the operation management apparatuses (OAMs) 4A and 4B may autonomously request candidate frequencies from the frequency management apparatus (SM) 5.

As described in this embodiment, a network node (or apparatus) such as the frequency management apparatus (SM) 5 allocates frequencies to a plurality of operator networks (or a plurality of operator systems), thereby making it possible to maintain equality among operators and to select the optimum operator network (or operator system) as the destination to which the shared frequency is allocated.

In the seventh and eighth embodiments regarding the LTE system, the case in which the TVWS is utilized in the LTE system is exemplified. Needless to say, however, the seventh and eighth embodiments may also be applied to a case in which there is no primary system like the TV broadcasting system 200 and a plurality of systems share a frequency. The plurality of systems may be a plurality of LTE systems or may include the LTE system and other system.

Other Embodiments

The processing performed by the measurement controller 10, the measurement unit 20, and the frequency controller 3 (or 3A to 3D) described in the first to eighth embodiments may be implemented by using a semiconductor processing device including an Application Specific Integrated Circuit (ASIC). Further, this processing may be implemented by causing a computer system including at least one processor (e.g., microprocessor, MPU, Digital Signal Processor (DSP)) to execute a program. Specifically, one or more programs including instructions for causing a computer system to perform the algorithms regarding the measurement controller 10, the measurement unit 20, and the frequency controller 3 described in the first to eighth embodiments may be created and supplied to the computer.

The program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Reference Embodiment

Hereinafter, a reference embodiment will be described. The technical ideas that will be understood from the following reference embodiment contribute to the solution of a problem different from the problem solved by the technical ideas understood from the first to eighth embodiments described above, and may be implemented independently from the technical ideas understood from the first to eighth embodiments.

Described in the second to eighth embodiments is the processing that the radio terminal 2 measures the shared frequency while the specific signal is being transmitted on the shared frequency (or candidate frequency) from the radio station 1 for the purpose of determining whether to use the shared frequency for the radio station 1 (or whether to allow the utilization by the radio station 1 of the shared frequency). This processing achieves the effect that, as described in the second embodiment, it is possible to assure that the radio terminal 2 is able to receive the shared frequency signal (i.e., the specific signal) from the radio station 1 with sufficient quality compared to the simple sensing, or in other words, that the radio communication system 100 is able to efficiently use the shared frequency.

In order to obtain the above effect, it is not necessary to perform the second terminal measurement of the shared frequency by using the terminal measurement procedure to perform the first terminal measurement specified (or defined) by the radio access technology (e.g., LTE, UMTS, CDMA2000, GSM, WiMAX) applied to the radio communication system 100. In other words, "the processing that the radio terminal 2 performs the second terminal measurement of the shared frequency while the specific signal is being transmitted on the shared frequency from the radio station 1" described in the second to eighth embodiments achieves the above effect also in the case in which the first and second terminal measurements use different terminal measurement procedures.

The reference embodiment including "the processing that the radio terminal 2 performs the second terminal measurement of the shared frequency while the specific signal is being transmitted on the shared frequency from the radio station 1" may be described, for example, as in the following Supplementary notes.

Supplementary Note 1

A radio communication system including a radio station and at least one radio terminal which communicates with the radio station, in which
the at least one radio terminal operates to perform a first terminal measurement of a first frequency licensed to the radio communication system and to perform a second terminal measurement of a second frequency shared by a plurality of radio systems including the radio communication system, and
the radio station operates to transmit a specific signal on the shared frequency when the second terminal measurement is performed.

Supplementary Note 2

The radio communication system according to Supplementary note 1, wherein the specific signal does not include a data channel signal for transmitting user data.

Supplementary Note 3

The radio communication system according to Supplementary note 2, in which the specific signal includes at least one of a pilot signal, a reference signal, and a synchronization signal.

Supplementary Note 4

The radio communication system according to any one of Supplementary notes 1 to 3, in which the specific signal is transmitted from the radio station at a transmission power lower than that of a downlink signal in a frequency licensed to the radio communication system.

Supplementary Note 5

The radio communication system according to any one of Supplementary notes 1 to 4, in which the specific signal is transmitted from the radio station at a transmission power equal to or lower than an upper limit value imposed by a management system of the shared frequency.

Supplementary Note 6

The radio communication system according to any one of Supplementary notes 1 to 5, in which the specific signal is transmitted to determine whether to allow utilization of the shared frequency in communication between the radio station and the at least one radio terminal.

Supplementary Note 7

The radio communication system according to any one of Supplementary notes 1 to 6, in which the specific signal is transmitted for at least one of a preliminary operation period, preparation period, and test period to determine whether to allow utilization of the shared frequency in communication between the radio station and the at least one radio terminal.

Supplementary Note 8

The radio communication system according to any one of Supplementary notes 1 to 7, further including a controller which operates to control utilization of the shared frequency in communication between the radio station and the at least one radio terminal based on a result of the second terminal measurement.

Furthermore, the embodiments and the reference embodiment stated above are merely examples of application of the technical ideas obtained by the present inventors. Needless to say, these technical ideas are not limited to those described in the above embodiments and the reference embodiment, and may be changed in various ways.

This application is based upon and claims the benefit of priority from Japanese Patent Application No. 2012-102336, filed on Apr. 27, 2012, the disclosure of which is incorporated herein in its entirety by reference.

REFERENCE SIGNS LIST

1, 1A, 1B, 1C, 1D RADIO STATIONS
2, 2A, 2B, 2C, 2D RADIO TERMINALS
3 FREQUENCY CONTROLLER
4, 4A, 4B OPERATION MANAGEMENT APPARATUSES (OPERATION ADMINISTRATION AND MAINTENANCE (OAM))
5 FREQUENCY MANAGEMENT APPARATUS (SPECTRUM MANAGER (SM))
6 GEO-LOCATION DATABASE (GDB)
10 MEASUREMENT CONTROLLER
11, 11A, 11B, 11C, 11D CELLS
20 MEASUREMENT UNIT
100, 100A, 100B RADIO COMMUNICATION SYSTEMS
200 TV BROADCASTING SYSTEM

The invention claimed is:

1. A radio terminal supporting Carrier Aggregation using a primary cell and at least one secondary cell operated in an unlicensed frequency, the radio terminal comprising:
a receiver configured to receive, in the primary cell, a Radio Resource Control (RRC) Connection Reconfiguration message, the RRC Connection Reconfiguration message including a first measurement configuration which includes a measurement duration in which a Received Signal Strength Indicator (RSSI) measurement is to be performed on the unlicensed frequency;
at least one processor configured to measure the RSSI on the unlicensed frequency within the measurement duration in which the RSSI measurement is to be performed; and
a transmitter configured to transmit, in the primary cell, a measurement report including a value of the RSSI.

2. The radio terminal according to claim 1, wherein
the RRC Connection Reconfiguration message includes a second measurement configuration indicating measurement items including a RSSI on the unlicensed frequency and at least one of Reference Signal Received Power (RSRP) and Reference Signal Received Quality (RSRQ) of reference signals transmitted from the radio station in the secondary cell operated in the band unlicensed frequency,
the at least one processor is further configured to measure, in accordance with the first measurement configuration and the second measurement configuration, the RSSI on the unlicensed frequency and at least one of the RSRP and the RSRQ of reference signals transmitted from the radio station in the secondary cell operated in the unlicensed frequency, and
the measurement report further includes at least one of the RSRP and the RSRQ.

3. The radio terminal according to claim 1, wherein
the RRC Connection Reconfiguration message includes a third measurement configuration which includes information regarding transmission timing of reference signals transmitted in the secondary cell operated in the unlicensed frequency, and
the at least one processor is further configured to measure, by using the information regarding transmission timing of reference signals transmitted in the secondary cell operated in the unlicensed frequency, the reference signals transmitted in the secondary cell operated in the unlicensed frequency.

4. A method of a radio terminal supporting Carrier Aggregation using a primary cell and at least one secondary cell operated in an unlicensed frequency, the method comprising:
receiving, in the primary cell, a Radio Resource Control (RRC) Connection Reconfiguration message, the RRC Connection Reconfiguration message including a first measurement configuration which includes a measurement duration in which a Received Signal Strength Indicator (RSSI) measurement is to be performed on the unlicensed frequency;
measuring the RSSI on the unlicensed frequency within the measurement duration in which the RSSI measurement is to be performed; and
transmitting, in the primary cell, a measurement report including a value of the RSSI.

5. The method according to claim 4, further comprising measuring, in accordance with the first measurement configuration and a second measurement configuration, a RSSI on the unlicensed frequency and at least one of Reference Signal Received Power (RSRP) and Reference Signal Received Quality (RSRQ) of reference signals transmitted from the radio station in the secondary cell operated in the unlicensed frequency, wherein
the RRC Connection Reconfiguration message includes the second measurement configuration indicating measurement items including the RSSI on the unlicensed frequency and at least one of RSRP and RSRQ of reference signals transmitted from the radio station in the secondary cell operated in the unlicensed frequency, and
the measurement report further includes at least one of the RSRP and the RSRQ.

6. The method according to claim 4, further comprising measuring, by using the information regarding transmission timing of reference signals transmitted in the secondary cell operated in the unlicensed frequency, the reference signals transmitted in the secondary cell operated in the unlicensed frequency, wherein
the RRC Connection Reconfiguration message includes a third measurement configuration which includes information regarding transmission timing of reference signals transmitted in the secondary cell operated in the unlicensed frequency.

7. A radio station supporting Carrier Aggregation using a primary cell and at least one secondary cell operated in an unlicensed frequency, the radio station comprising:
a transmitter configured to transmit to a radio terminal, in the primary cell, a Radio Resource Control (RRC) Connection Reconfiguration message, the RRC Connection Reconfiguration message including a first measurement configuration which includes a measurement duration in which a Received Signal Strength Indicator (RSSI) measurement is to be performed on the unlicensed frequency; and
a receiver configured to receive, in the primary cell, a measurement report including a value of the RSSI, the value of the RSSI being measured by the radio terminal on the unlicensed frequency within the measurement duration in which the RSSI measurement is to be performed.

8. The radio station according to claim 7, wherein
the RRC Connection Reconfiguration message includes a second measurement configuration indicating measurement items including a RSSI on the unlicensed frequency and at least one of Reference Signal Received Power (RSRP) and Reference Signal Received Quality (RSRQ) of reference signals transmitted from the radio station in the secondary cell operated in the unlicensed frequency, and
the measurement report further includes at least one of the RSRP and the RSRQ, the at least one of the RSRP and the RSRQ being measured by the radio terminal in accordance with the first measurement configuration and the second measurement configuration, the RSSI on the unlicensed frequency and at least one of the RSRP and the RSRQ of reference signals transmitted from the radio station in the secondary cell operated in the unlicensed frequency.

9. The radio station according to claim 7, wherein the RRC Connection Reconfiguration message includes a third measurement configuration which includes information regarding transmission timing of reference signals transmitted in the secondary cell operated in the unlicensed frequency.

10. A method of a radio station supporting Carrier Aggregation using a primary cell and at least one secondary cell operated in an unlicensed frequency, the method comprising:

transmitting to a radio terminal, in the primary cell, a Radio Resource Control (RRC) Connection Reconfiguration message, the RRC Connection Reconfiguration message including a first measurement configuration which includes a measurement duration in which a Received Signal Strength Indicator (RSSI) measurement is to be performed on the unlicensed frequency; and receiving, in the primary cell, a measurement report including a value of the RSSI, the value of the RSSI being measured by the radio terminal on the unlicensed frequency within the measurement duration in which the RSSI measurement is to be performed.

11. The method according to claim 10, wherein the RRC Connection Reconfiguration message includes a second measurement configuration indicating measurement items including a RSSI on the unlicensed frequency and at least one of Reference Signal Received Power (RSRP) and Reference Signal Received Quality (RSRQ) of reference signals transmitted from the radio station in the secondary cell operated in the unlicensed frequency, and the measurement report further includes at least one of the RSRP and the RSRQ, the at least one of the RSRP and the RSRQ being measured by the radio terminal in accordance with the first measurement configuration and the second measurement configuration, the RSSI on the unlicensed frequency and at least one of the RSRP and the RSRQ of reference signals transmitted from the radio station in the secondary cell operated in the unlicensed frequency.

12. The method according to claim 10, wherein the RRC Connection Reconfiguration message includes a third measurement configuration which includes information regarding transmission timing of reference signals transmitted in the secondary cell operated in the unlicensed frequency.

* * * * *